United States Patent
Metzger et al.

(10) Patent No.: US 8,606,817 B2
(45) Date of Patent: Dec. 10, 2013

(54) DATABASE ACCESS UNBLOCKER

(75) Inventors: Timothy C. Metzger, New York, NY (US); Subhan V. Dandekar, Rockaway, NJ (US); Michael E. Kozikowski, Wilmington, DE (US); Sireesh Kumar Nuthi, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 288 days.

(21) Appl. No.: 13/018,230

(22) Filed: Jan. 31, 2011

(65) Prior Publication Data

US 2012/0197941 A1    Aug. 2, 2012

(51) Int. Cl.
*G06F 17/30* (2006.01)

(52) U.S. Cl.
USPC .......................................... 707/783

(58) Field of Classification Search
USPC .......................... 707/3, 783; 726/3
See application file for complete search history.

(56) References Cited

U.S. PATENT DOCUMENTS

2009/0288145 A1* 11/2009 Huber et al. ............ 726/3

OTHER PUBLICATIONS

U.S. Appl. No. 61/374,481, filed Aug. 17, 2010.
U.S. Appl. No. 61/374,482, filed Aug. 17, 2010.
U.S. Appl. No. 13/013,694, filed Jan. 25, 2011.
U.S. Appl. No. 13/013,695, filed Jan. 25, 2011.

* cited by examiner

*Primary Examiner* — Etienne Leroux
(74) *Attorney, Agent, or Firm* — Michael A. Springs; Moore & Van Allen, PLLC; James C. Edwards

(57) ABSTRACT

Embodiments of the invention provide for a centralized system for database access management. In specific embodiments, the centralized system provides for granting users temporal access to databases for a prescribed period of time, such that upon expiration of the time period the user is automatically blocked (i.e., added back to the blacklist) from accessing the database. Moreover, as a result of centralized management, reporting and auditing of actions related to database access management are greatly improved in that all actions are recorded and a historical database of such actions is available to system users. In addition, the centralized system provides for automatic notification to predetermined stakeholders based on occurrence of predetermined system actions, such as blocking a user from database access, unblocking a user from database access (i.e., granting access) or the like.

23 Claims, 26 Drawing Sheets

| User NBID: | | ~452 |
|---|---|---|
| User is a Service Account: | No ▽ ~464 | |

If the above user is a service account, provide the service account owner below.

| Account Owner: | | ~466 |
|---|---|---|
| Manager: | (MANAGER ID) ~454 | |
| LOB: | ADMIN LOB: ▽ ~456 | |
| User First Name: | | ~458 |
| User Last Name: | | ~460 |
| User Email: | 468 | ~462 |
| | [Cancel] [Block User] ~470 | |

| | | |
|---|---|---|
| User NBID: | XXXXXX | ~452 |
| User is a Service Account: | Yes [V] | ~464 |

If the above user is a service account, provide the service account owner below.

| | | |
|---|---|---|
| Account Owner: | XXXXXX | ~466 |
| Manager: | (MANAGER ID) ~454 | |
| LOB: | Business Group [V] | ~456 |
| User First Name: | First Name | ~458 |
| User Last Name: | Last Name | ~460 |
| User Email: | XXX@Company.com | ~462 |

468

[ Cancel ]   [ Block User ] ~470

FIG. 8

DB Access Unblocker

| Access Control | User Management | History |

Filter: [____] [First Name ▼] [Go] [Remove Filter]

[Add Blocked User] [Export to Excel]

Logged In User: XXXXXXX (XXXXX) - MANAGER
Business Group
Switch Account

| NEID | First Name | Last Name | Type | LOB | Current Status | Remove User |
|---|---|---|---|---|---|---|
| XXXXXX | First Name | Last Name | MANAGER | Business Group | UNBLOCKED | |
| XXXXXX | First Name | Last Name | AUDITOR | Business Group | UNBLOCKED | |
| XXXXXX | First Name | Last Name | DBA | Business Group | UNBLOCKED | |
| XXXXXX | First Name | Last Name | MANAGER | Business Group | UNBLOCKED | REMOVE USER |
| XXXXXX | First Name | Last Name | DBA | Business Group | UNBLOCKED | |
| XXXXXX | First Name | Last Name | AUDITOR | Business Group | UNBLOCKED | REMOVE USER |
| XXXXXX | First Name | Last Name | DBA | Business Group | UNBLOCKED | |
| XXXXXX | First Name | Last Name | AUDITOR | Business Group | UNBLOCKED | REMOVE USER |
| XXXXXX | First Name | Last Name | MANAGER | Business Group | UNBLOCKED | |

410, 418, 472

EIM - Behavioral Analysis: Questions/Comments

FIG. 9

| Remove User | | |
|---|---|---|
| User ID: | XXXXXX ~562 | |
| Name: | ~564 | |
| User Type: | DBA ~566 | |
| User LOB: | Business Group ~568 | |
| Business Reason: | ~570 | |

572~ Cancel    Remove User ~574

FIG. 12

|                | Edit User                          |
|----------------|------------------------------------|
| User ID:       | xxxxxxx  ~582                      |
| First Name:    | ☐ ~584                             |
| Last Name:     | ☐ ~586                             |
| Email:         | ☐ ~588                             |
|                | 590~[Cancel]  [Update info]~592    |

| Unblock Request | |
|---|---|
| User: | XXXXXX ~602 |
| Manager: | XXXXXX ~604 |
| LOB: | Business Group ~606 |
| Start: | 4/27/2010  2051 ~608 |
| End: | 4/27/2010  2151 ~610 |
| Ticket Type: | Service Center ~612 |
| Ticket ID: | XXXXX ~614 |
| Business Reason: | As part of this ticket, User instructs to run conflict querry expected under title 'ABCD' ~616 |
| | 618~(Cancel)  (Submit Unblock)~620 |

DATABASE ACCESS UNBLOCKER

FIELD

In general, embodiments of the invention relate to database access management and, more particularly, methods, devices and computer program products for centralized management on database access and, specifically, providing temporal access (i.e., unblocking) to users who are ordinarily blocked from access.

BACKGROUND

Many businesses, organizations or the like rely on databases that store non-public information (NPI). For example, financial institutions, such as commercial banks, implement databases that provide for storing credit card tables and related information. Such highly sensitive databases require monitoring for the purpose of track the use of such databases and ensuring that the non-public information is kept as such.

In many instances, businesses and organizations implement database monitoring applications as a means of monitoring the databases that store highly sensitive and/or non-public information. For example, Guardium® of Waltham, Mass. provides commercial database monitoring applications are. Such commercial application implement firewalls or the like that serve to prevent authorized users from performing unauthorized actions such as executing queries on sensitive table, changing sensitive data values, adding or deleting critical tables, creating new user accounts, modifying privileges and the like. The firewalls or the like provide for comparing the authorized users credentials to stored access credentials to determine if the user is authorized for access. If the user's credentials do not match those stored, access is denied to the user and the database connection is dropped.

However, known commercial applications for database monitoring tend to be decentralized or distributed systems. This means that access lists, otherwise referred to as "blacklists", are apparatus specific; each database monitoring apparatus has its own blacklist associated therewith. As such, managing of the blacklist across a business or organization becomes a difficult task, in that a change to the business-wide or line of business-wide blacklist requires that a change be made to each blacklist associated with each database monitoring apparatus. The need to make multiple changes to multiple blacklists is prone to error and results in inconsistency amongst the multiple blacklists.

Additionally, known commercial applications require that two changes to the blacklist be made when a user is given temporal access to a database. For example, a first change to the blacklist is implemented when a user is given access to a database (i.e., removed from the blacklist) and a second change to the blacklist is required when the user no longer requires access to the database (i.e., added back to the blacklist). Such a need to perform multiple changes to the list when a user is provided temporary access to a database is also susceptible to error, in that, often times the second change, which adds the user back to the blacklist (i.e., blocks the user from access), fails to occur. In such instances in which the user is given temporary access but is not added back to the blacklist after the expiration of the temporary time period, the database is compromised by being accessible to users that should be authorized for such access.

Therefore, a need exists to develop methods, devices, computer program products and the like for managing the access to databases that store highly sensitive/non-public information. The desired methods, devices, computer program products should provide for central management of database access, such that a change to the access list is incorporated business-wide, line of business wide or the like without the need to individually update or change each access list corresponding to a specific access monitoring system. Moreover, by providing for centralized management higher scalability can be achieved and tighter access control is placed on to whom and under what condition a change to database access can be granted. In addition, the desired methods, devices, computer program products should obviate the need to perform multiple updates/changes to the access list in the event that a user is provided temporary access to the database. Additionally the desired methods, devices, computer program products should improve reporting and auditing of database access management.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. The summary's sole purpose is to present some concepts of one or more embodiments in a simplified form as a prelude to the more detailed description that is presented later.

Thus, further details are provided below for a centralized system for database access management. The centralized nature of the database access system means that all the access lists within a business or a line-of-business can be managed centrally, without the need to manage each access list independently. As a result of centralized management, reporting and auditing of actions related to database access management are greatly improved in that all actions are recorded and a historical database of such actions is available to system users. In addition, the centralized system provides for automatic notification to predetermined stakeholders based on occurrence of predetermined system actions, such as blocking a user from database access, unblocking a user from database access (i.e., granting access) or the like. Additionally by assigning an appropriate access level to various roles within the management system, separation of duties is achieved which results in tighter overall control of to whom and under what conditions database access can be granted.

In specific embodiments, the centralized system provides for granting users temporal access to databases for a prescribed period of time, such that upon expiration of the time period the user is automatically blocked (i.e., added back to the blacklist) from accessing the database. Such automatic blocking of the user after expiration of the unblock time period, obviates the need to perform a separate update/change to the access list after the need for database access expires. As a result of automatic blocking, oversights in failing to add the user back to the blocked access list are lessened, if not eliminated and the need for constant manual intervention is significantly reduced.

An apparatus configured for centralized database access management defines first embodiments of the invention. The apparatus includes a computing platform including a processor and a memory. The apparatus further includes a database access management tool stored in the memory, executable by the processor and configured to provide centralized database access management for one or more databases. The database access management tool includes a database access control routine configured to receive an unblock input that includes a time period for providing a database user access to a database from which the database user is currently blocked from access. Further, the routine is configured to automatically block the database user from accessing the database upon expiration of the time period.

In specific embodiment of the apparatus, the database access management tool further includes a user management routine configured to receive a database user addition input that adds a new database user to the database access management tool and provides for managing the new database user's access to the one or more databases. In further related embodiments, the user management routine is further configured to receive a user deletion input that removes a database user from the database access management tool.

In additional specific embodiments of the apparatus, the database access management tool further includes a tracking routine that is configured to track and store actions taken by the access management tool. In such embodiments, the tracked actions may include, but are not limited to, adding a new database user, deleting a database user, logging into the database access management tool, unblocking a database user from blocked access, blocking a database user from access to an unblocked database prior to expiration of the predetermined time period and exporting data from the tool. In such embodiments, the tracking routine may be further configured to provide a network-accessible presentation of the tracked actions occurring within the database access management tool.

In additional specific embodiments of the apparatus, the database access management tool further comprises a notification routine configured to automatically communicate a notification that notifies one or more predetermined entities of actions occurring within the database access management tool. In such embodiments of the invention, the actions warranting automatic notifications may include, but are not necessarily limited to, unblocking a database user, blocking a database user, adding a new database user, or deleting a database user.

Moreover, in still further embodiments of the apparatus, the database access control routine may be configured to receive a block input that blocks the database user's access to the database prior to expiration of the time period.

A method for centralized database access management defines second embodiments of the invention. The method includes providing access to a computer network-based database access management tool. Additionally, the method includes receiving, via the database access management tool, an unblock input that is configured to provide a database user access to a database from which the database user is currently blocked from access. The unblock input includes a time period for providing the database user access to the database. In addition the method includes automatically blocking, via the database access management tool, the database user from accessing the database upon expiration of the time period.

In specific embodiments the method further includes receiving, via the database access management tool, a database user addition input that is configured to add a new database user to the database access management tool and provides for managing the new database user's access to the one or more databases. In related embodiments the method may also include receiving, via the database access management tool, a database user deletion input that is configured to remove a database user from the database access management tool.

In still further specific embodiments the method includes storing, in computing device memory, information associated with the unblock input or any other predetermined actions performed on the database access management tool. In such embodiments the method may additionally include providing, via the database access management tool, access to the information associated with the unblock input or the other predetermined actions.

Additional embodiments of the method include automatically communicating, via the database access management tool, electronic notifications to one or more predetermined entities based on receiving the unblock input or any other predetermined actions occurring via the database access management tool. The electronic notifications notify the one or more predetermined entities of the action preformed via the tool, such as unblocking a database user, blocking a database user, adding a new database user, deleting a database user or the like.

Moreover, additional embodiments of the method include receiving, via the database access management tool, a block input that is configured to block the database user's access to the database prior to expiration of the time period.

A computer program product provides for third embodiments of the invention. The computer program product includes a non-transitory computer-readable medium. The computer-readable medium includes a first set of codes for causing a computer to provide access to a computer network-based database access management tool. The computer-readable medium additionally includes a second set of codes causing a computer to receive, via the database access management tool, an unblock input that is configured to provide a database user access to a database from which the database user is currently blocked from access. The unblock input includes a time period for providing the database user access to the database. Additionally, the computer-readable medium includes a third set of codes for causing a computer to automatically block, via the database access management tool, the database user from accessing the database upon expiration of the time period.

Thus, as described in further detail below, embodiments of the invention provide for a centralized system for database access management. In specific embodiments, the centralized system provides for granting users temporal access to databases for a prescribed period of time, such that upon expiration of the time period the user is automatically blocked (i.e., added back to the blacklist) from accessing the database. As a result of automatic blocking, oversights in failing to add the user back to the blocked access list are lessened, if not eliminated and the need for constant manual intervention is significantly reduced. Moreover, as a result of centralized management, reporting and auditing of actions related to database access management are greatly improved in that all actions are recorded and a historical database of such actions is available to system users. In addition, the centralized system provides for automatic notification to predetermined stakeholders based on occurrence of predetermined system actions, such as blocking a user from database access, unblocking a user from database access (i.e., granting access) or the like. Additionally by assigning an appropriate access level to various roles within the management system, separation of duties is achieved which results in tighter overall control of to whom and under what conditions database access can be granted.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
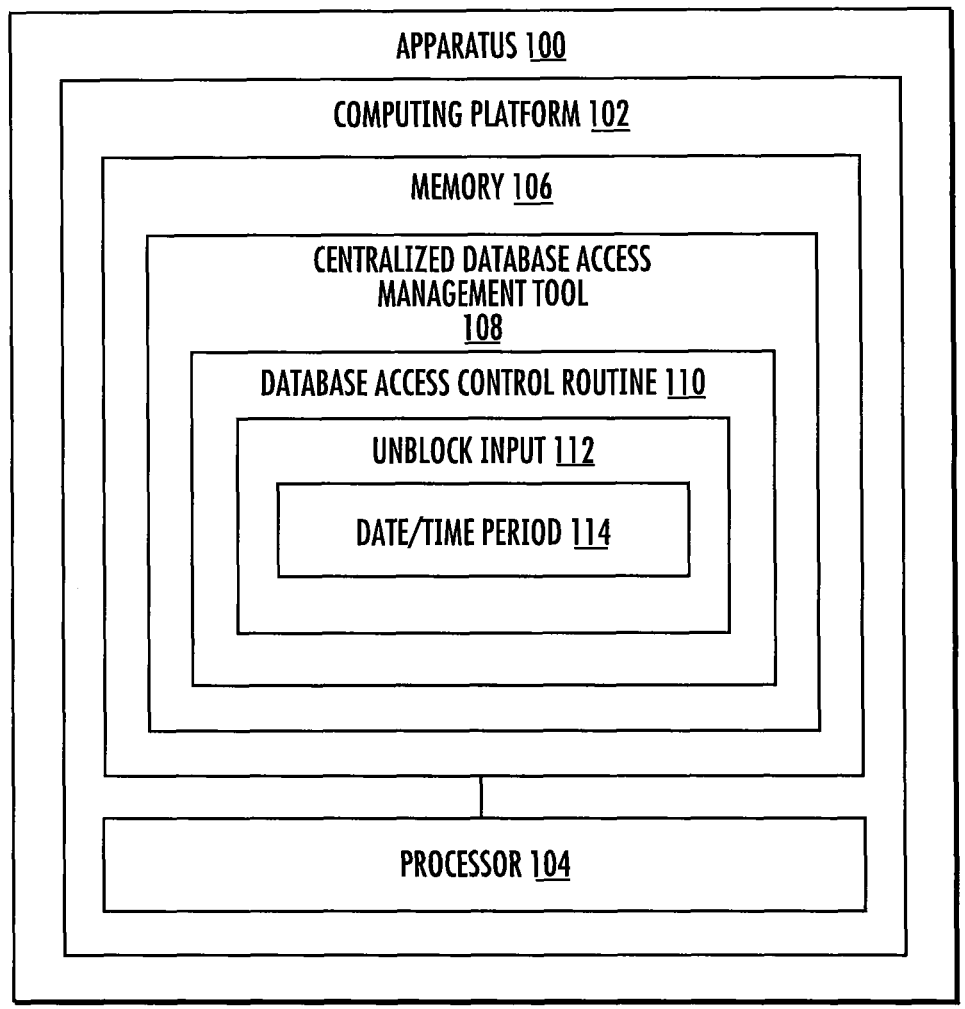
Figure 2:
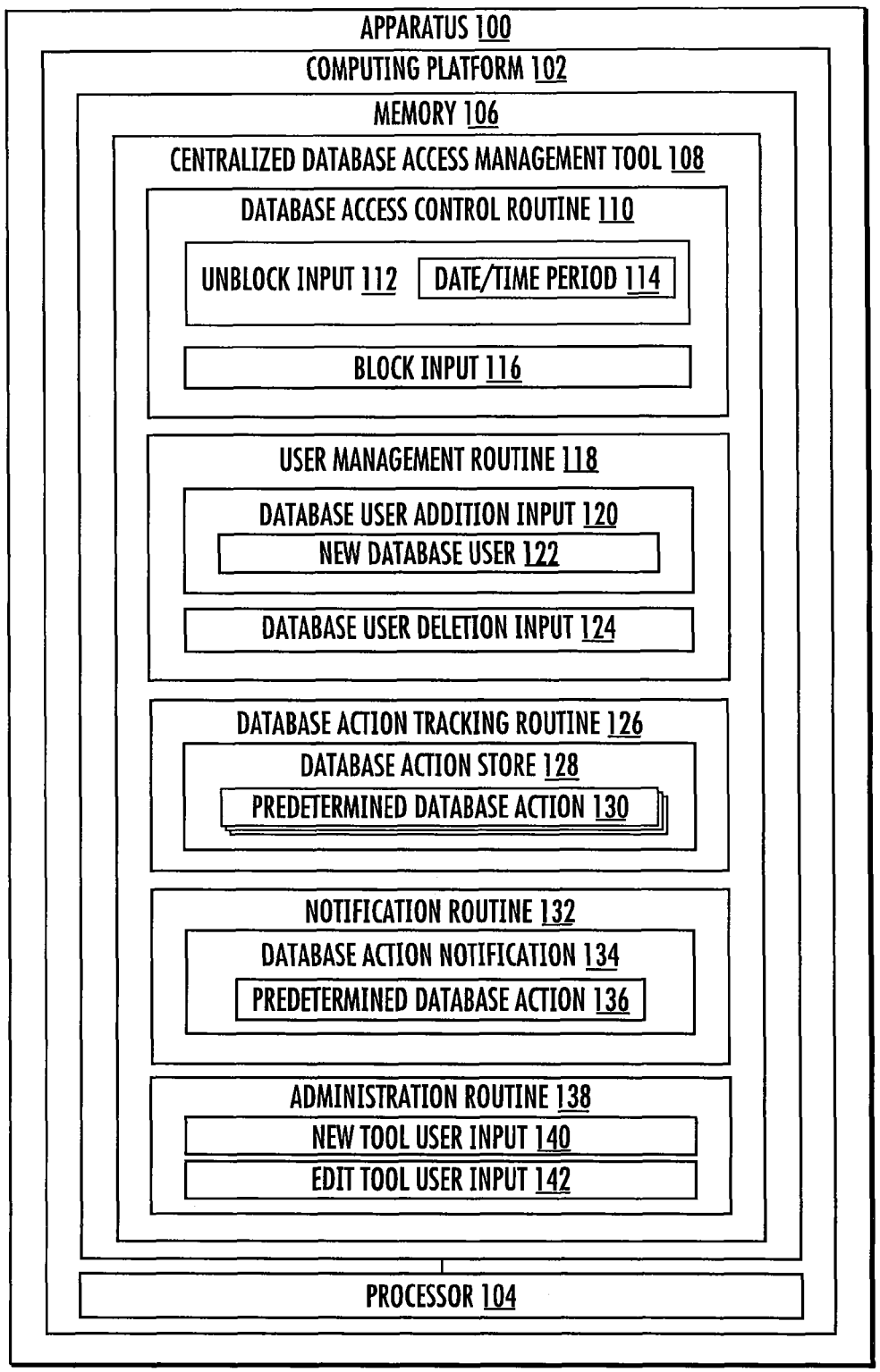
Figure 3:
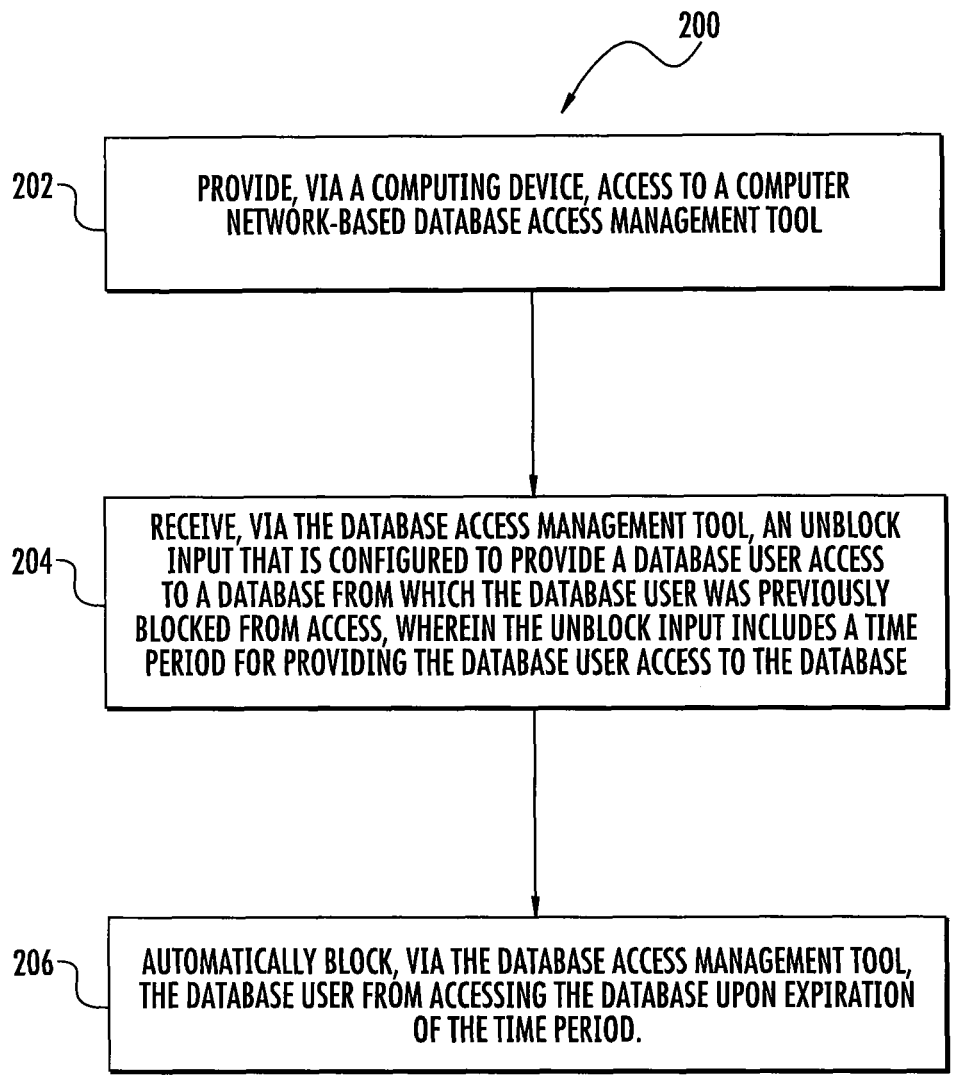
Figure 4:
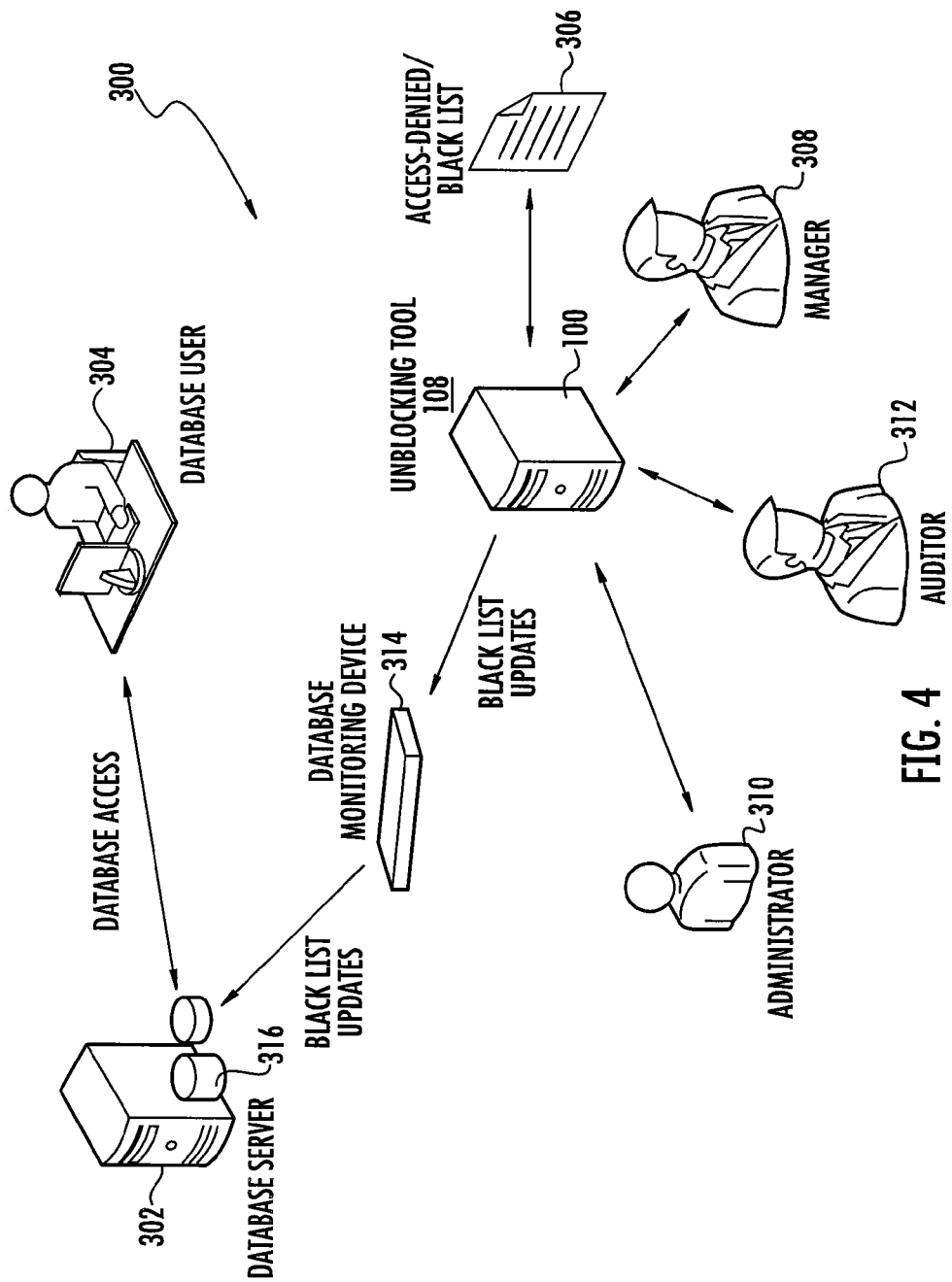
Figure 5:
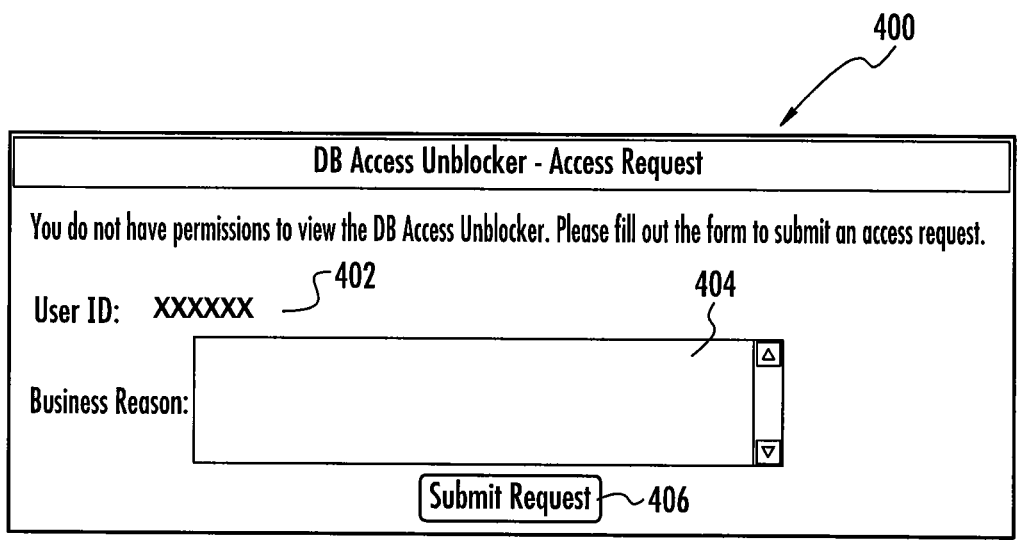
Figure 6:
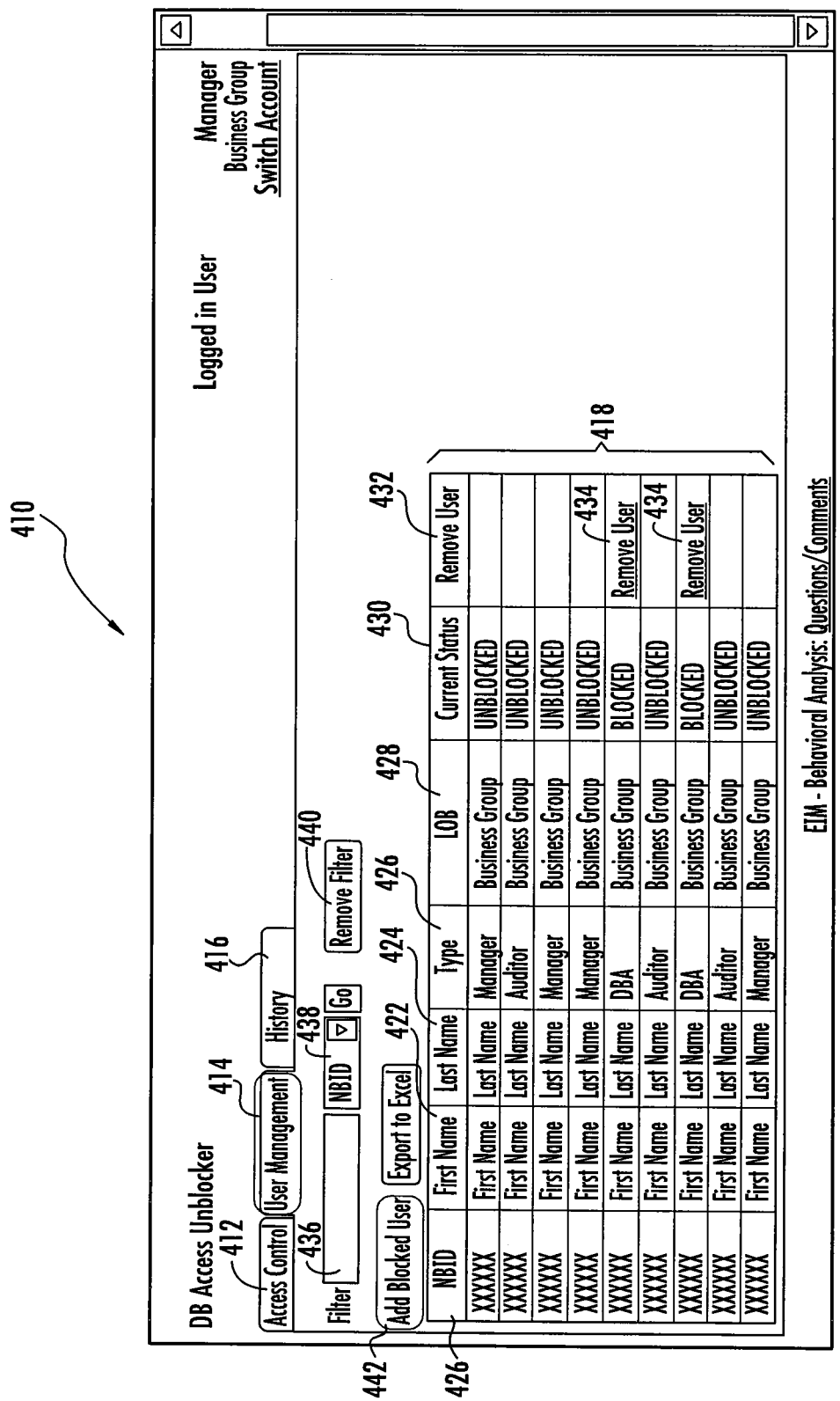
Figure 10:
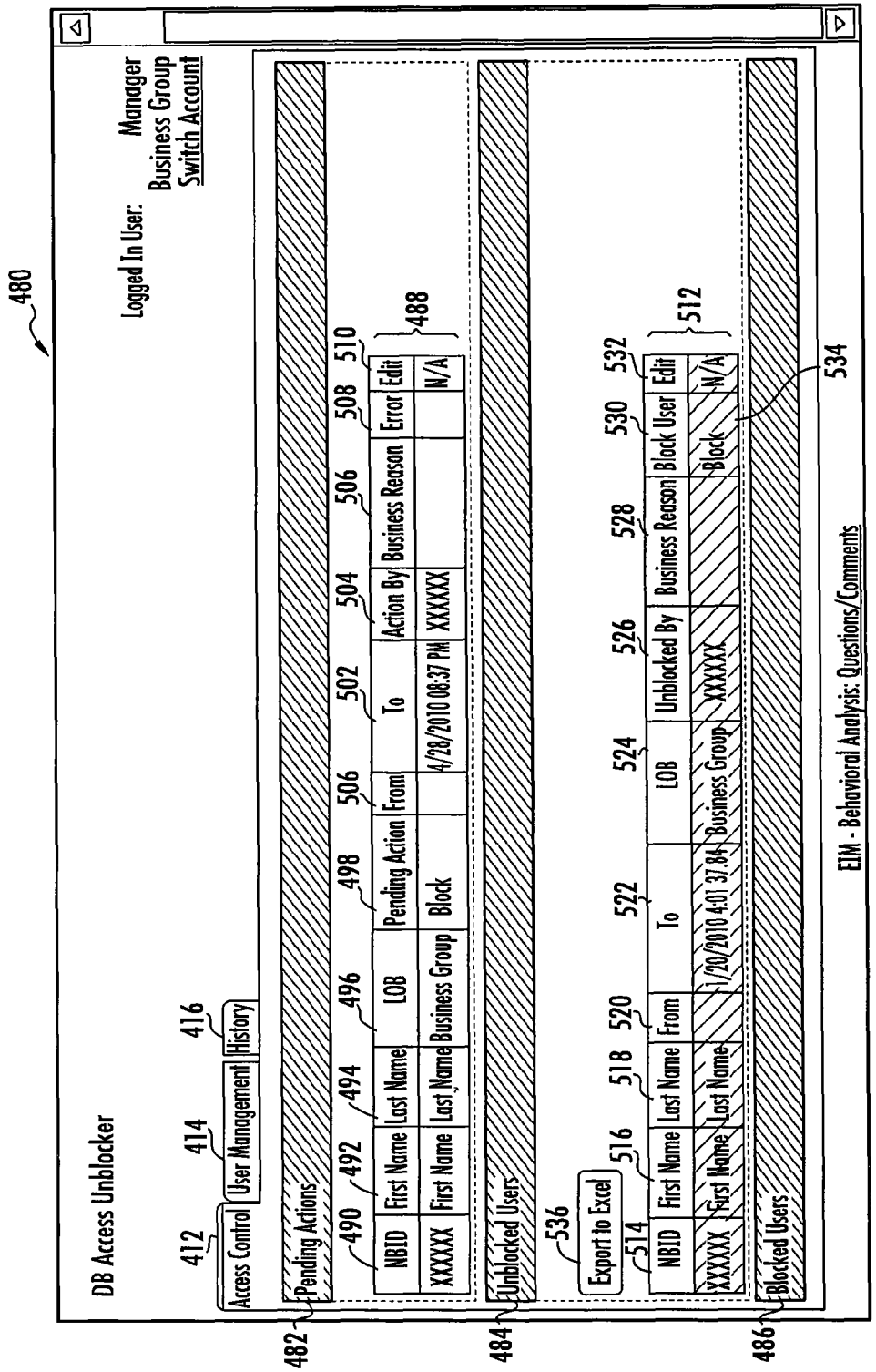
Figure 11:
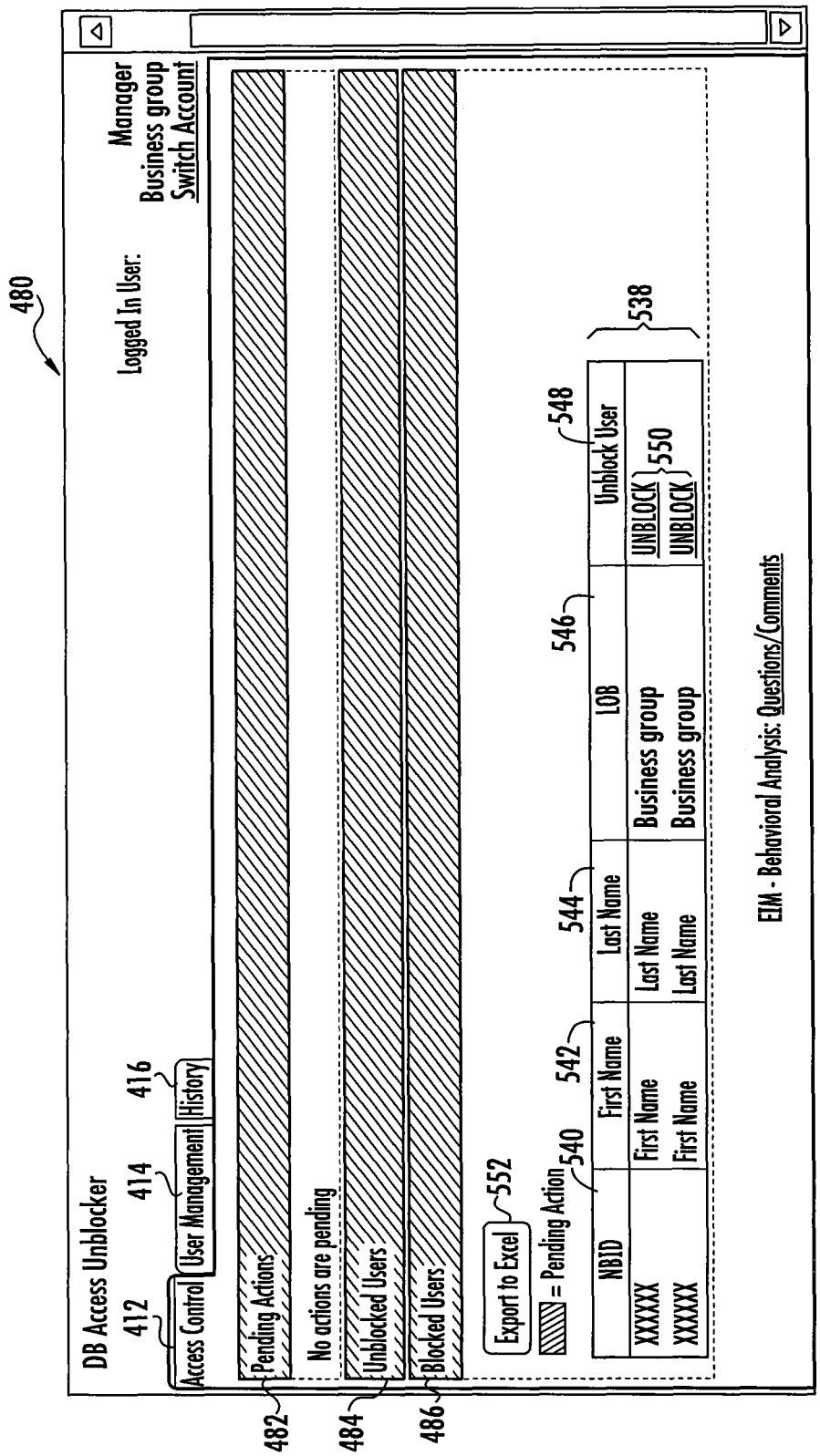
Figure 14:
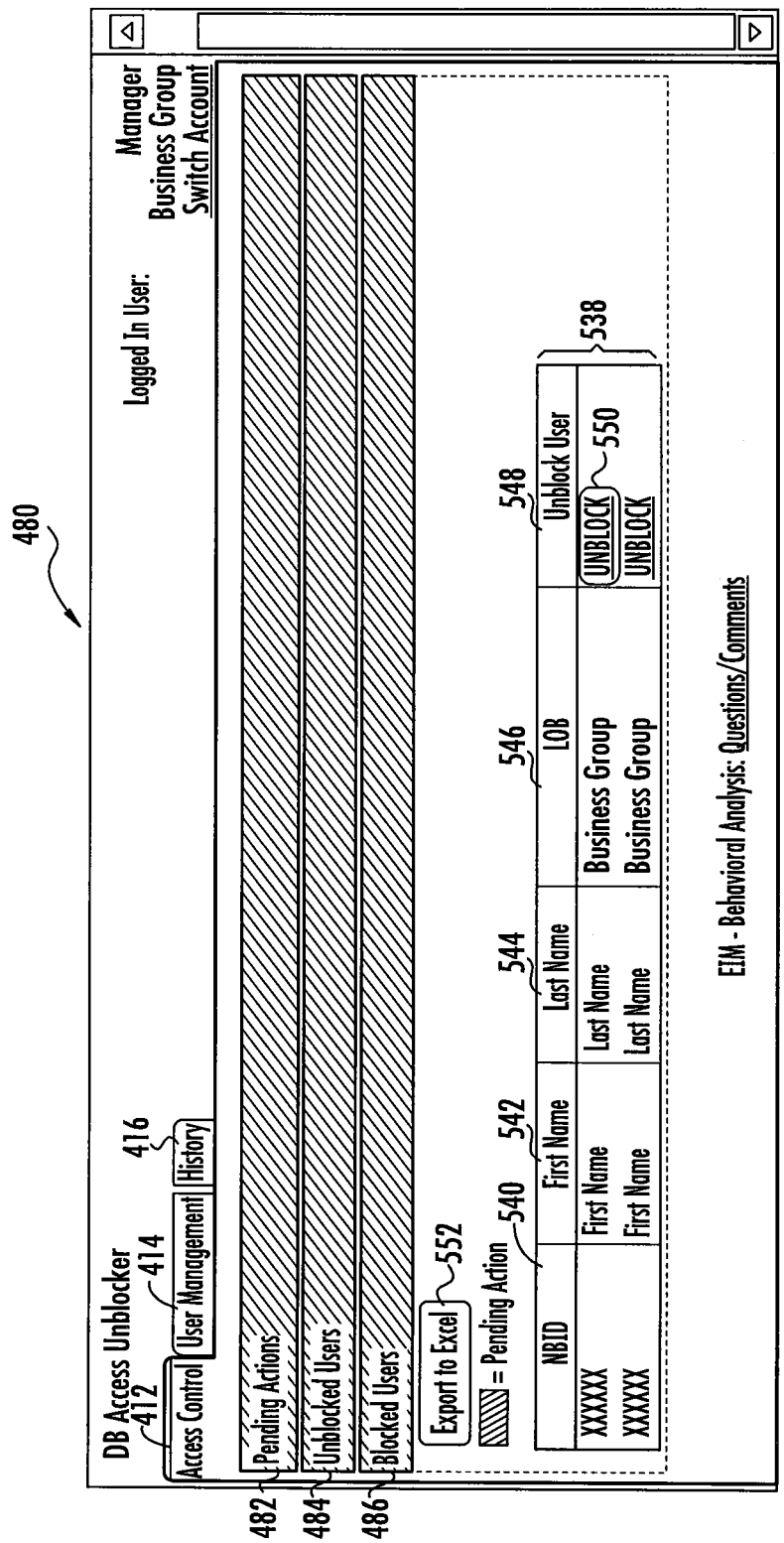
Figure 16:
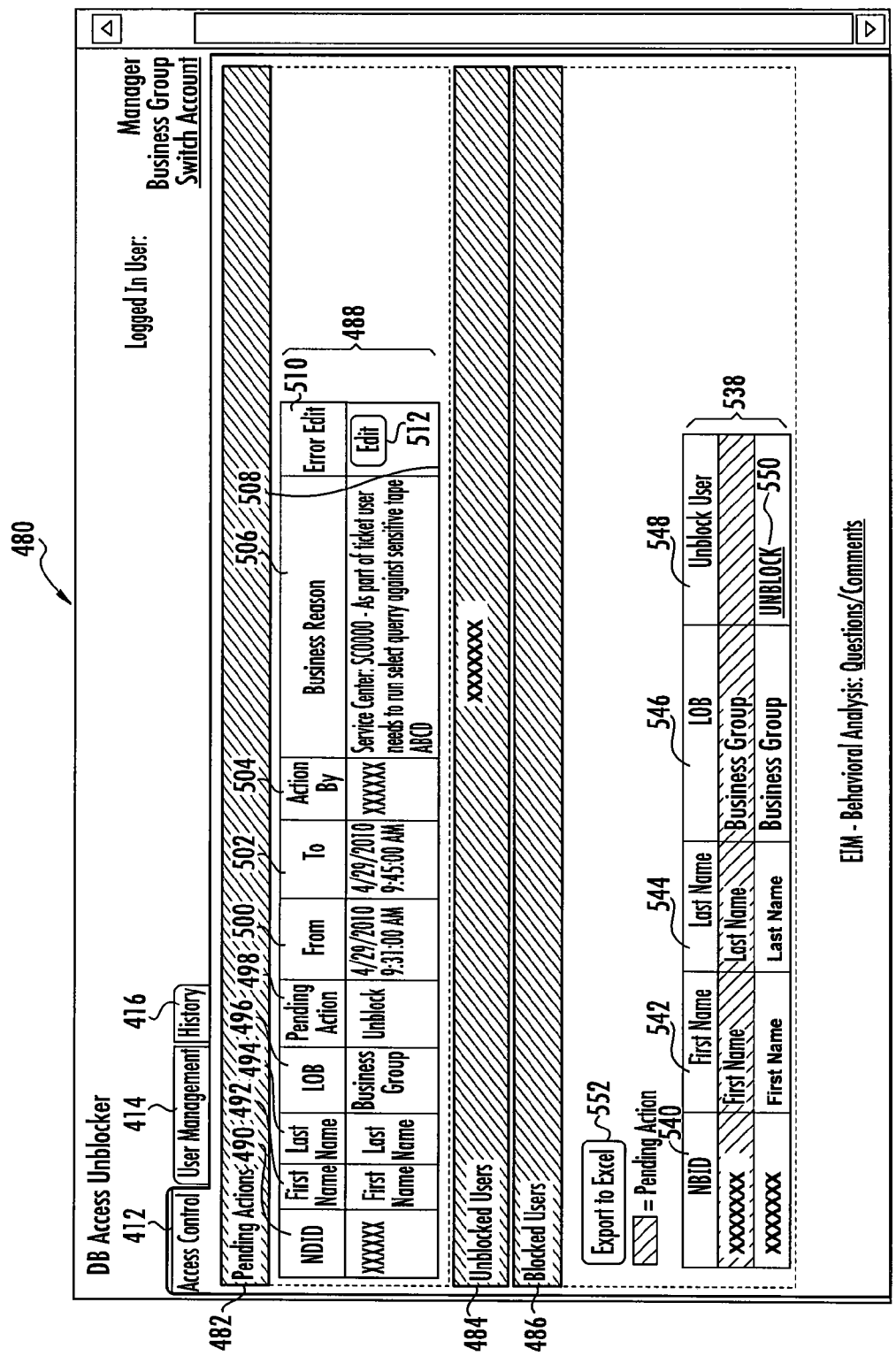
Figure 18:
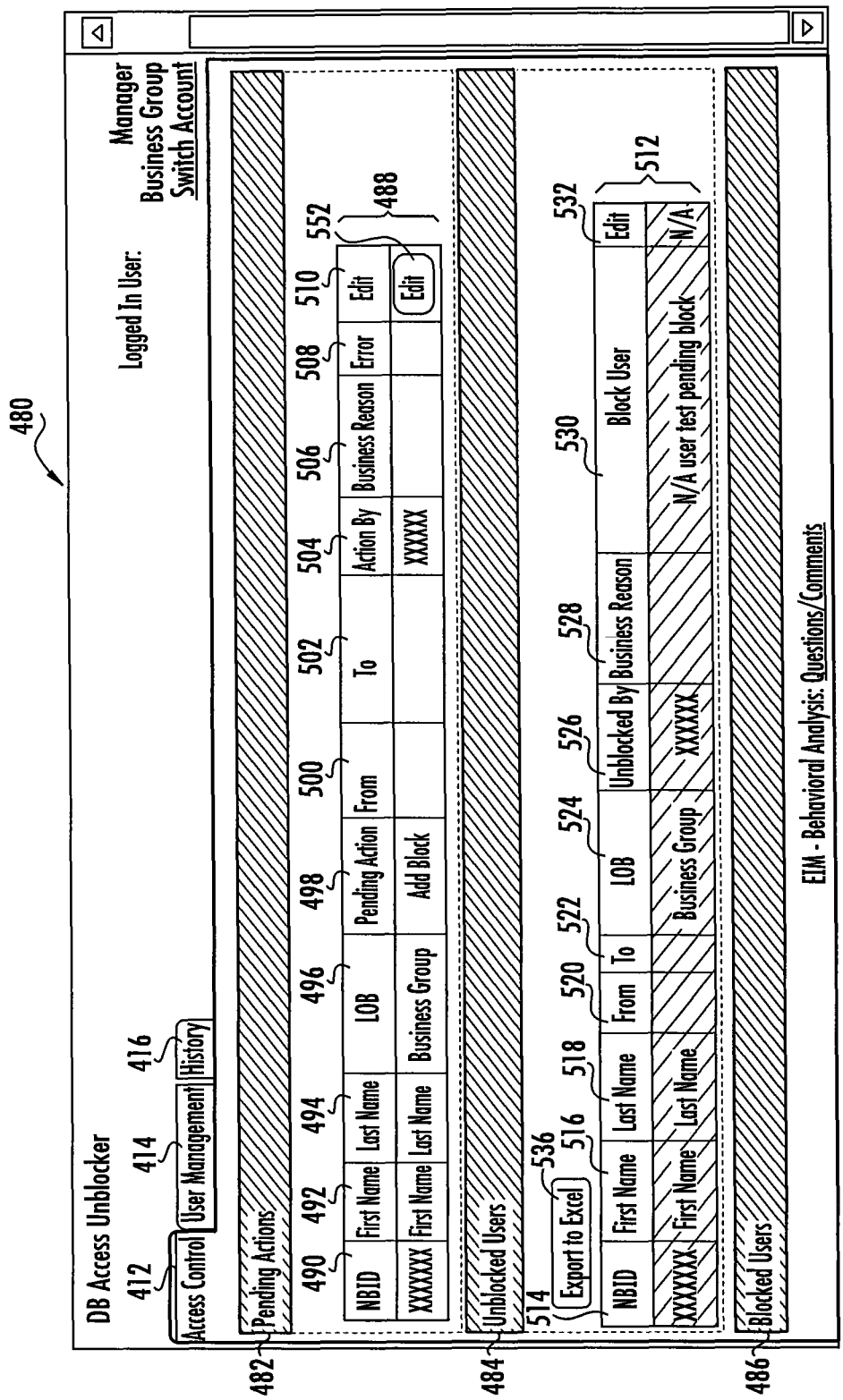
Figure 19:
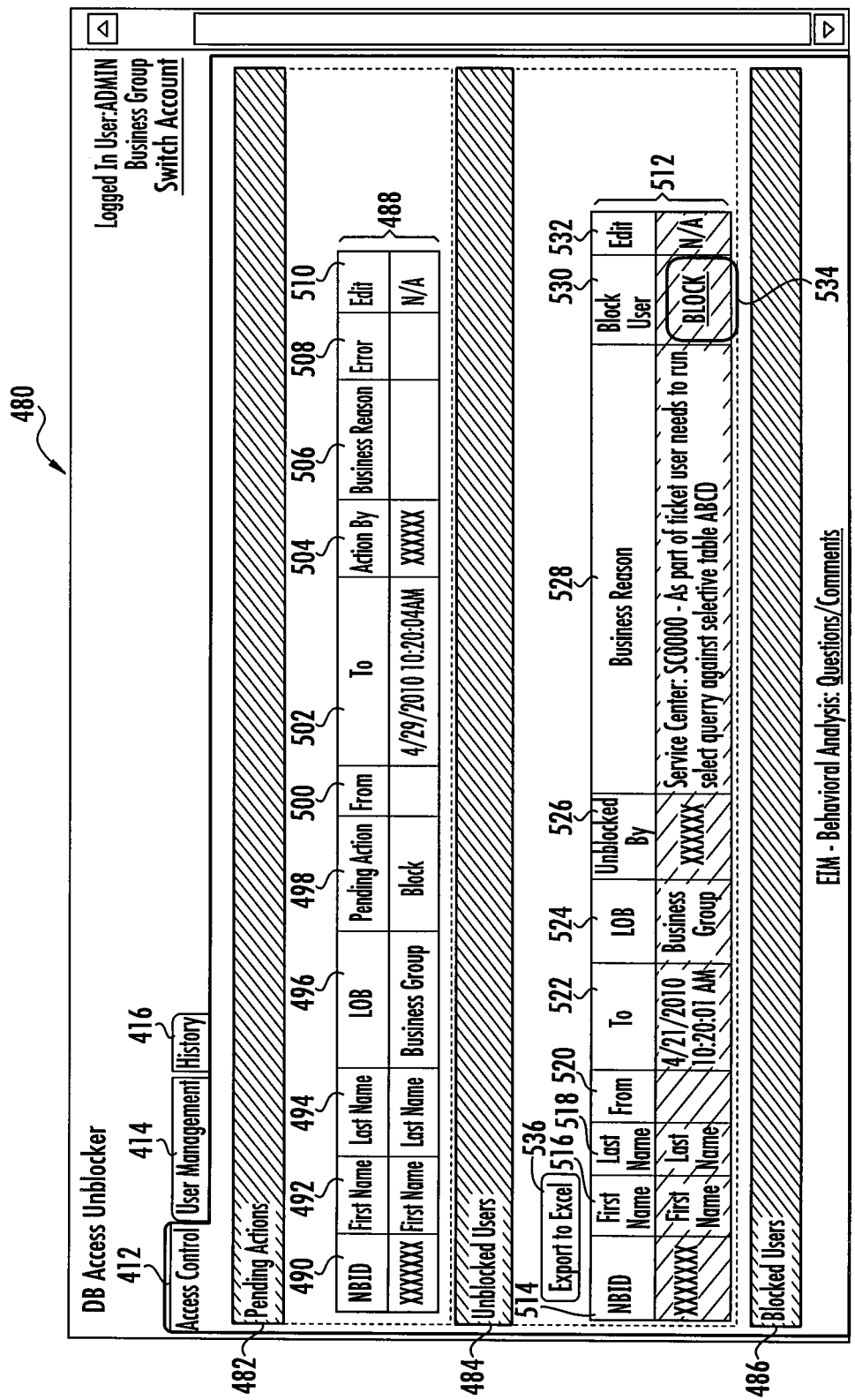
Figure 21:
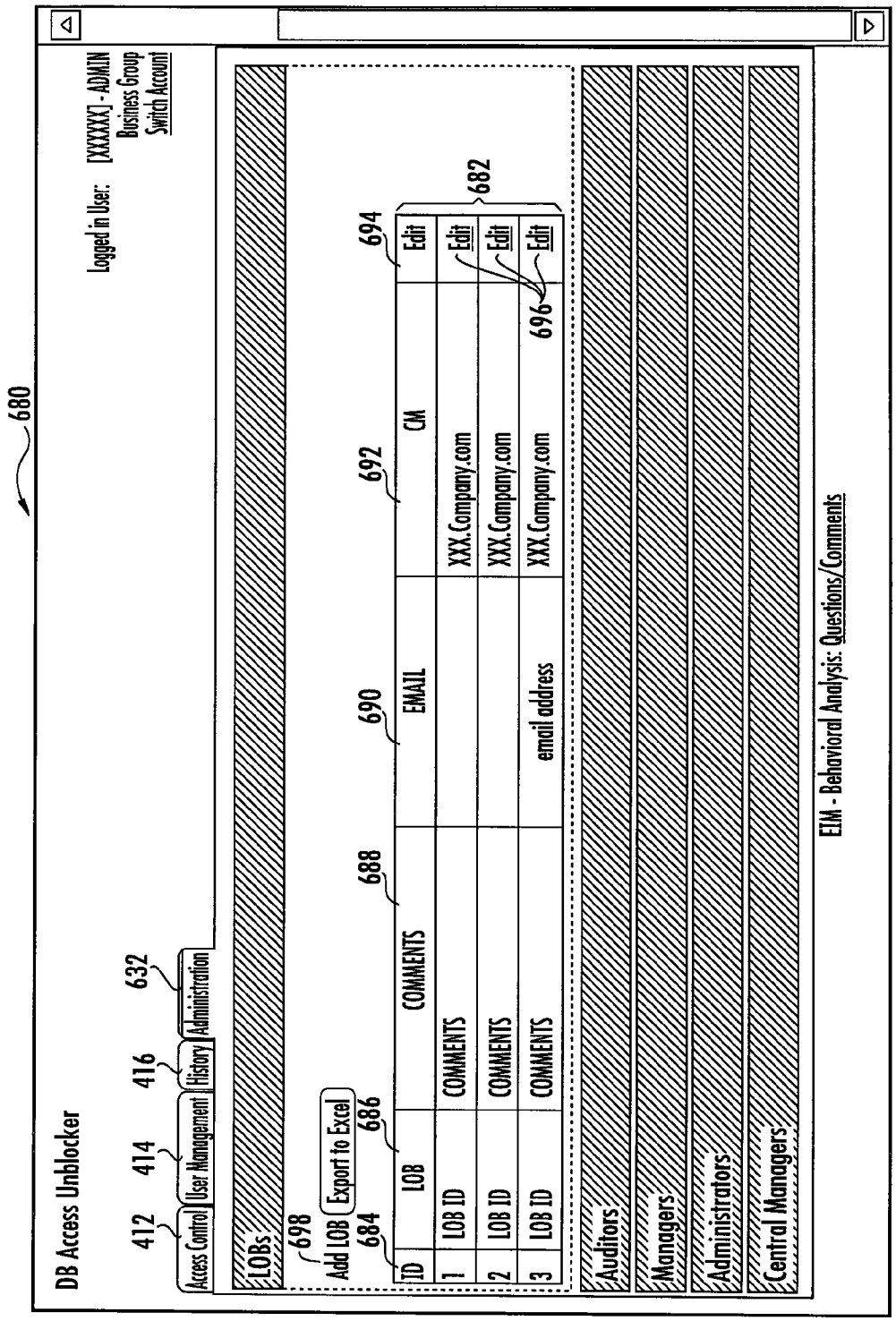
Figure 22:
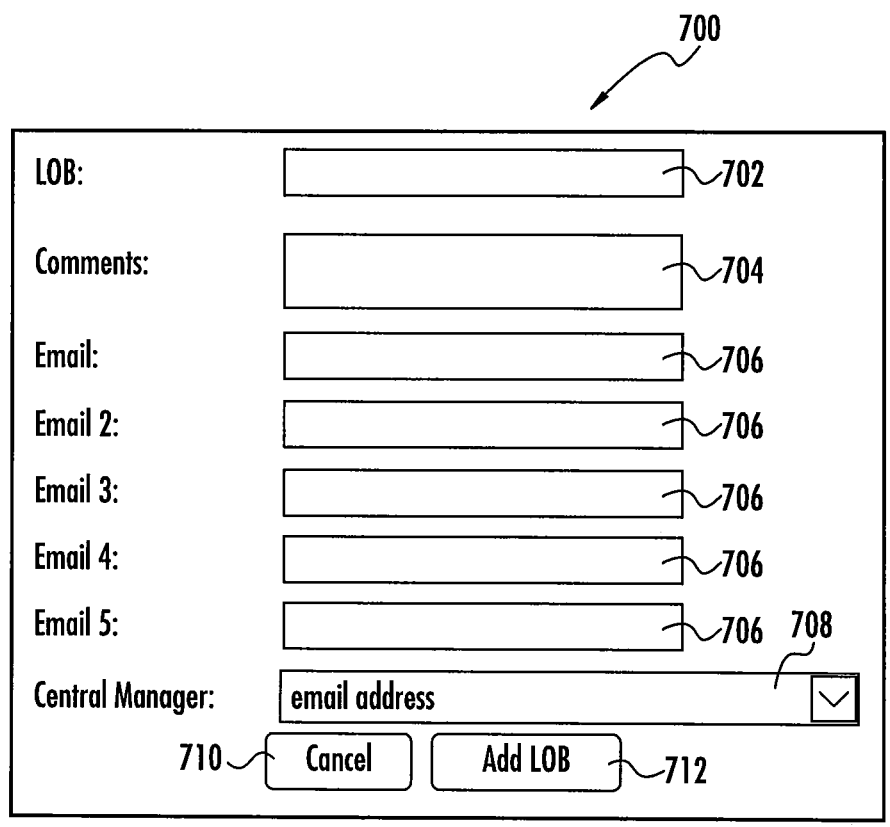
Figure 23:
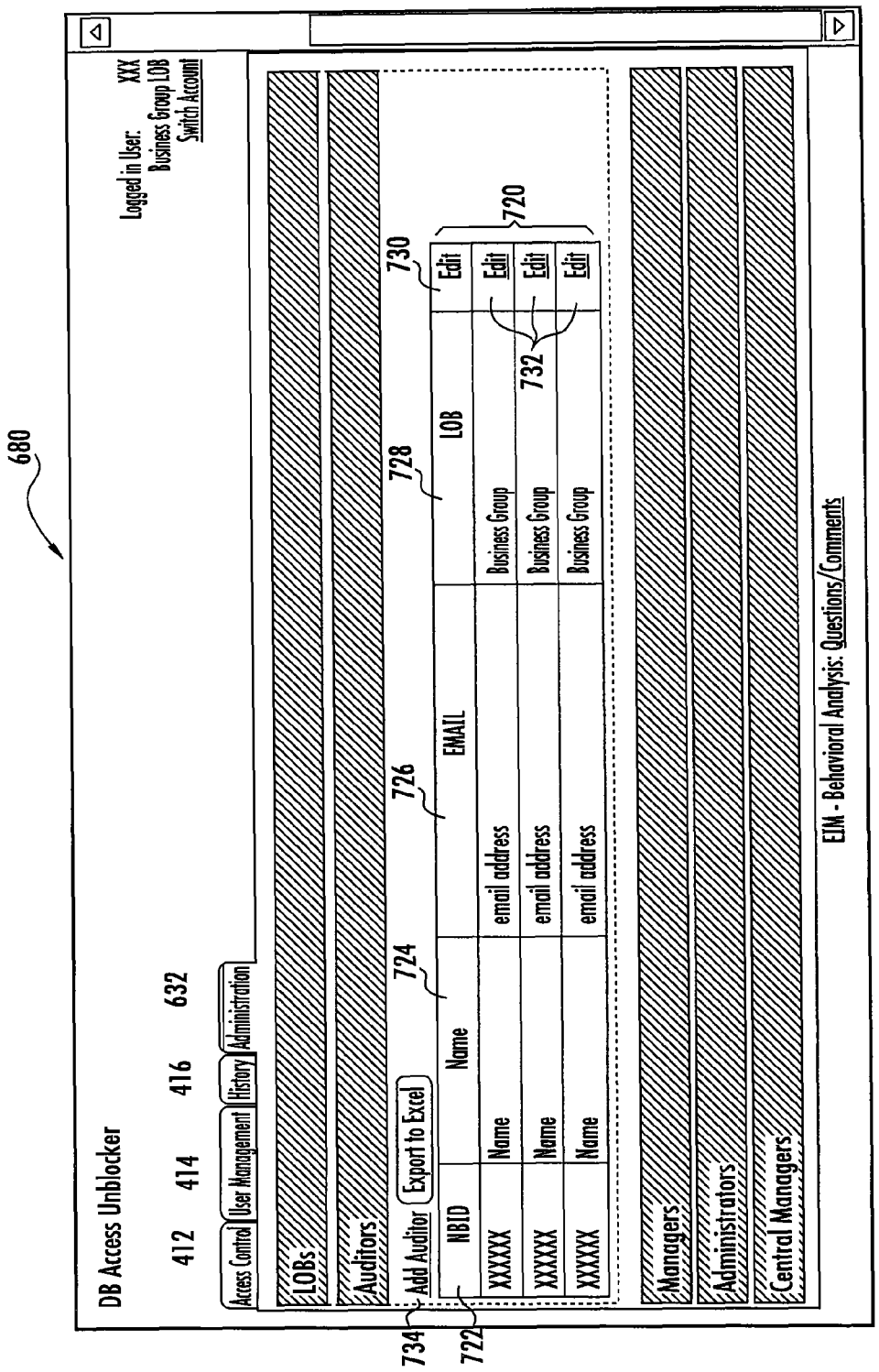
Figure 24:
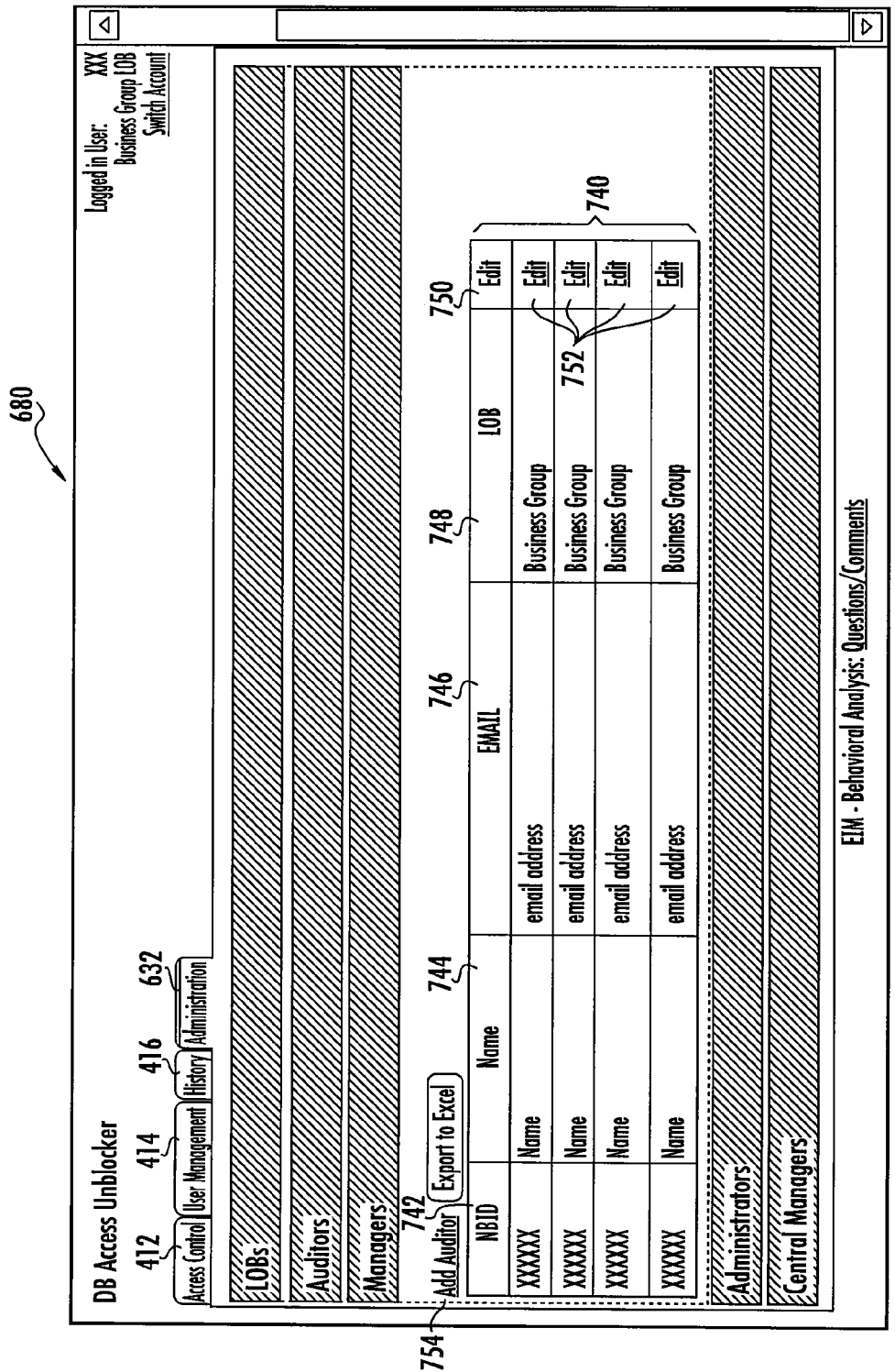
Figure 25:
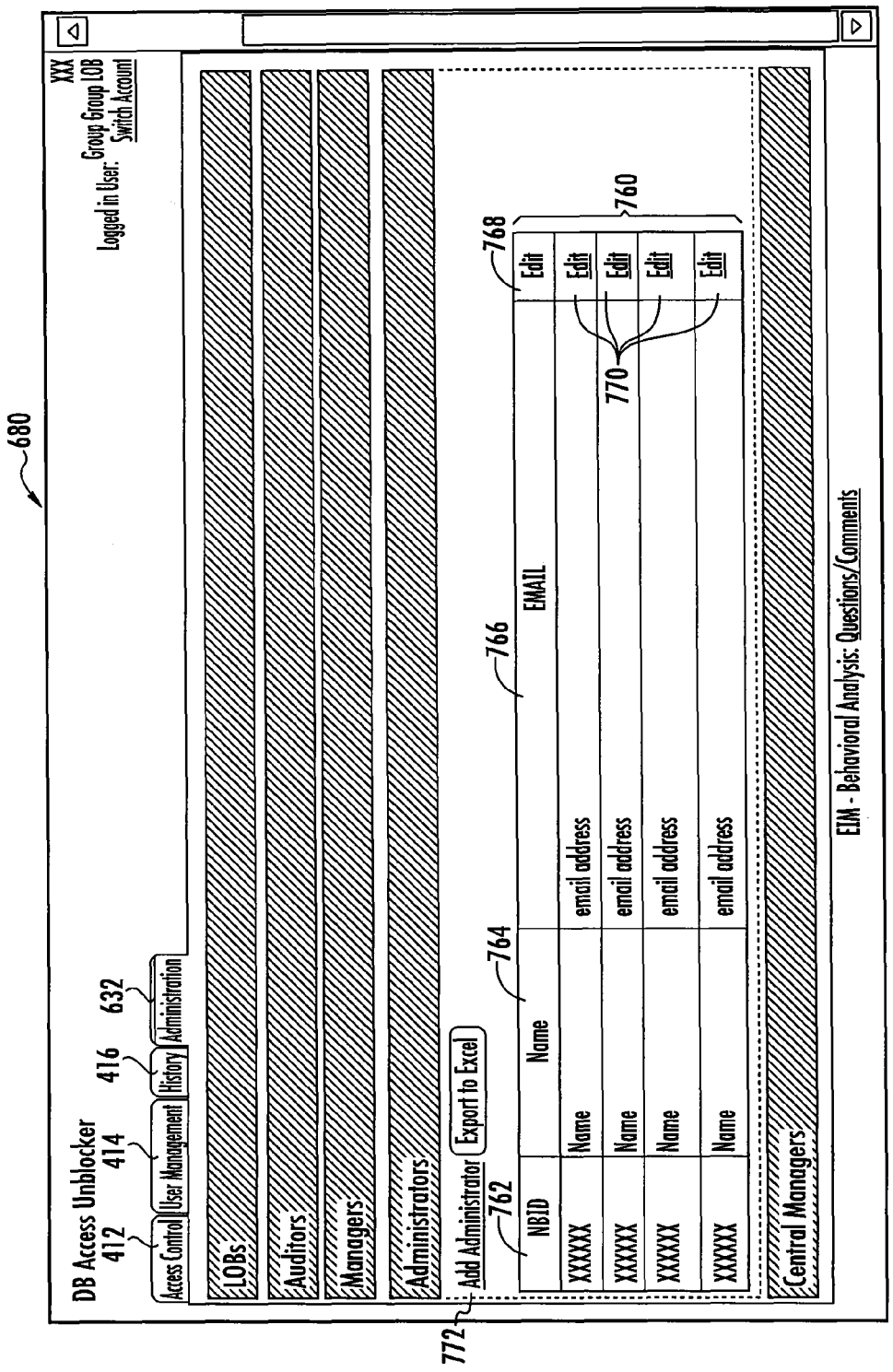
Figure 26:
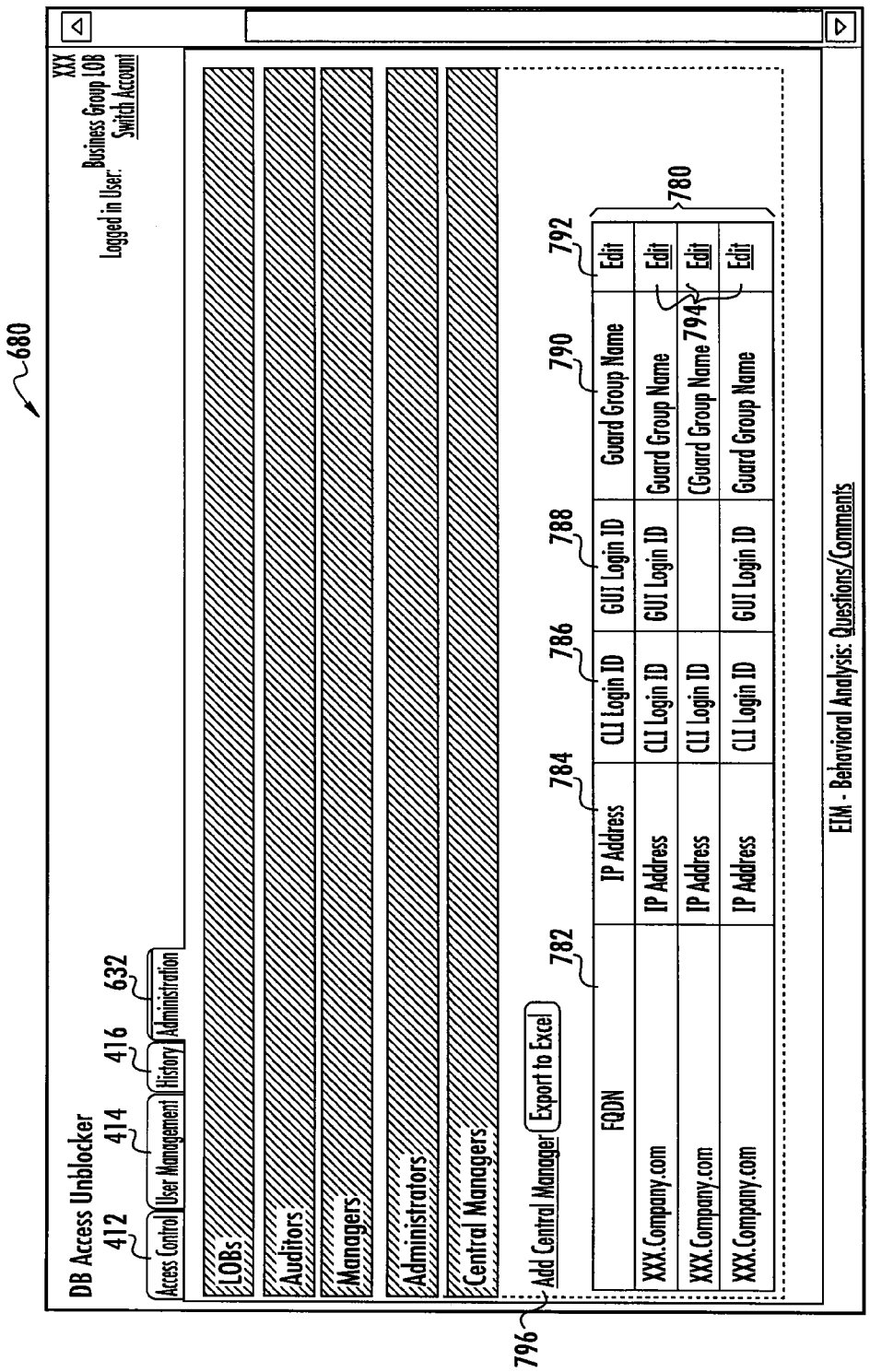

Having thus described embodiments of the invention in general terms, reference may now be made to the accompanying drawings:

FIG. 1 is a block diagram of an apparatus configured for centralized database access management; in accordance with embodiments of the present invention;

FIG. 2 is a more detailed block diagram of an apparatus configured for centralized database access management; in accordance with embodiments of the present invention;

FIG. 3 is a schematic diagram of a system for centralized database access management, in accordance with embodiments of the present invention;

FIG. 4 is flow diagram of a method for centralized database management, in accordance with present embodiments of the invention;

FIG. 5 is a user interface displayed in a database access system and configured to initiate a database access system access request, in accordance with embodiments of the present invention;

FIG. 6 is a user interface displayed in a database access system and configured to initiate a adding a new database user to the system, in accordance with embodiments of the present invention;

FIG. 7 is a user interface displayed in a database access system and configured to receive new database user information, in accordance with embodiments of the present invention;

FIG. 8 is a user interface displayed in a database access system, configured to receive new database user information and highlighting filled-in entries, in accordance with embodiments of the present invention;

FIG. 9 is a user interface displayed in a database access system and highlighting the entry of the new database user in the database user listing, in accordance with embodiments of the present invention;

FIG. 10 is a user interface displayed in a database access system, highlighting that a newly added database user is currently unblocked from access and has a pending action to block access, in accordance with embodiments of the present invention;

FIG. 11 is a user interface displayed in a database access system and highlighting that the new database user is blocked from access upon execution of the previous pending block action, in accordance with embodiments of the present invention;

FIG. 12 is a user interface displayed in a database access system and configured to receive a request to remove a database user from the database access management system, in accordance with embodiments of the present invention;

FIG. 13 is a user interface displayed in a database access system and configured to receive a request to edit information associated with a database user, in accordance with embodiments of the present invention;

FIG. 14 is a user interface displayed in a database access system and configured to initiate an unblock input to grant a database user temporary access to a database, in accordance with embodiments of the present invention;

FIG. 15 is a user interface displayed in a database access system and configured to receive information associated with an unblock request include a start date/time and end date/time, in accordance with embodiments of the present invention;

FIG. 16 is a user interface displayed in a database access system, highlighting that a unblock request has been received and is pending, in accordance with embodiments of the present invention;

Figure 17:
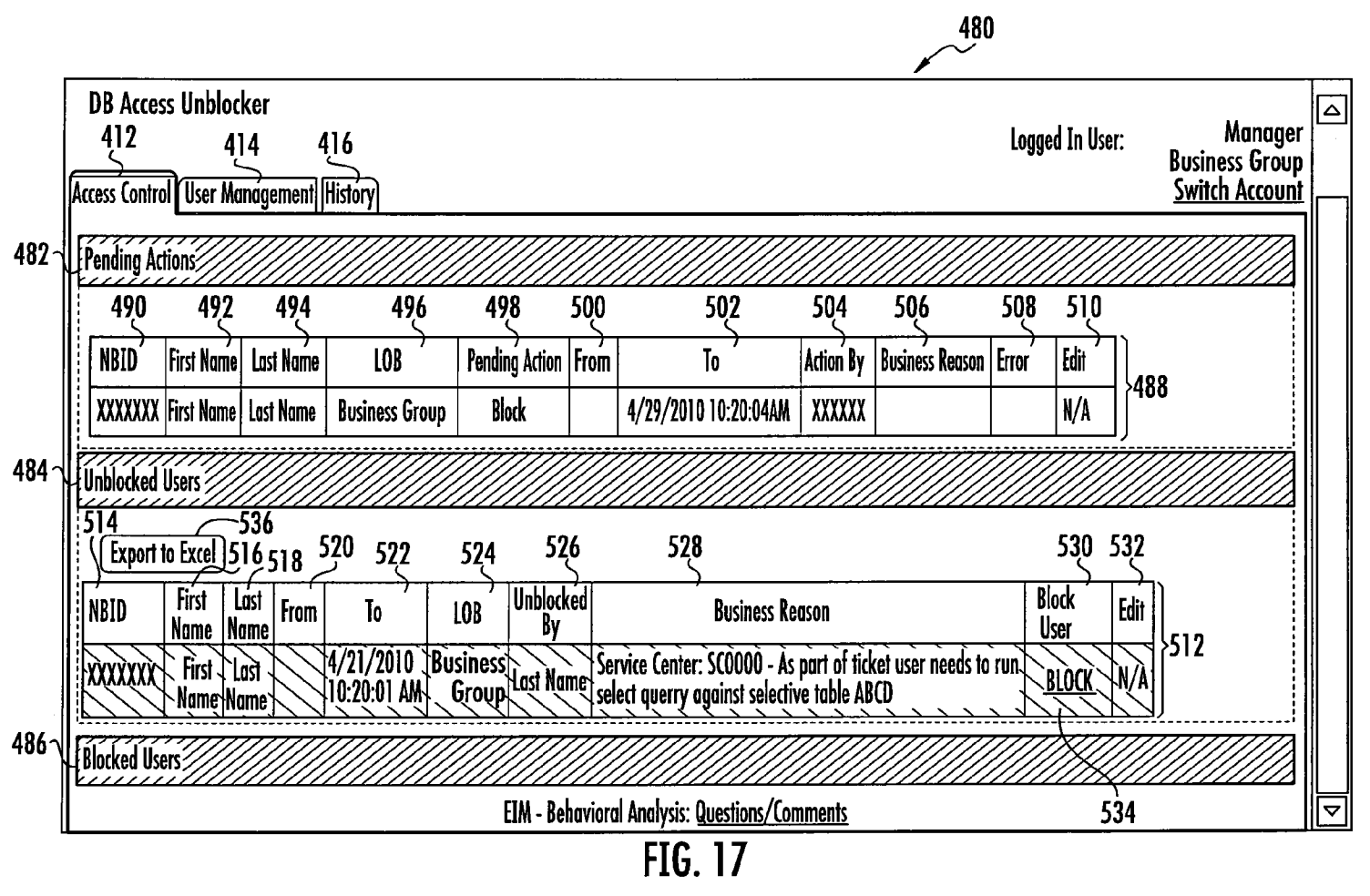

FIG. 17 is a user interface displayed in a database access system, highlighting that an unblock request has been activated and that an associated block request is pending upon expiration of the time period for unblock, in accordance with embodiments of the present invention;

FIG. 18 is a user interface displayed in a database access system and configured to initiate a unblock request for a new database user to thereby override the default block state, in accordance with embodiments of the present invention;

FIG. 19 is a user interface displayed in a database access system and configured to initiate a block request for a database user prior to expiration of the time period for unblocking the database user, in accordance with embodiments of the present invention;

Figure 20:
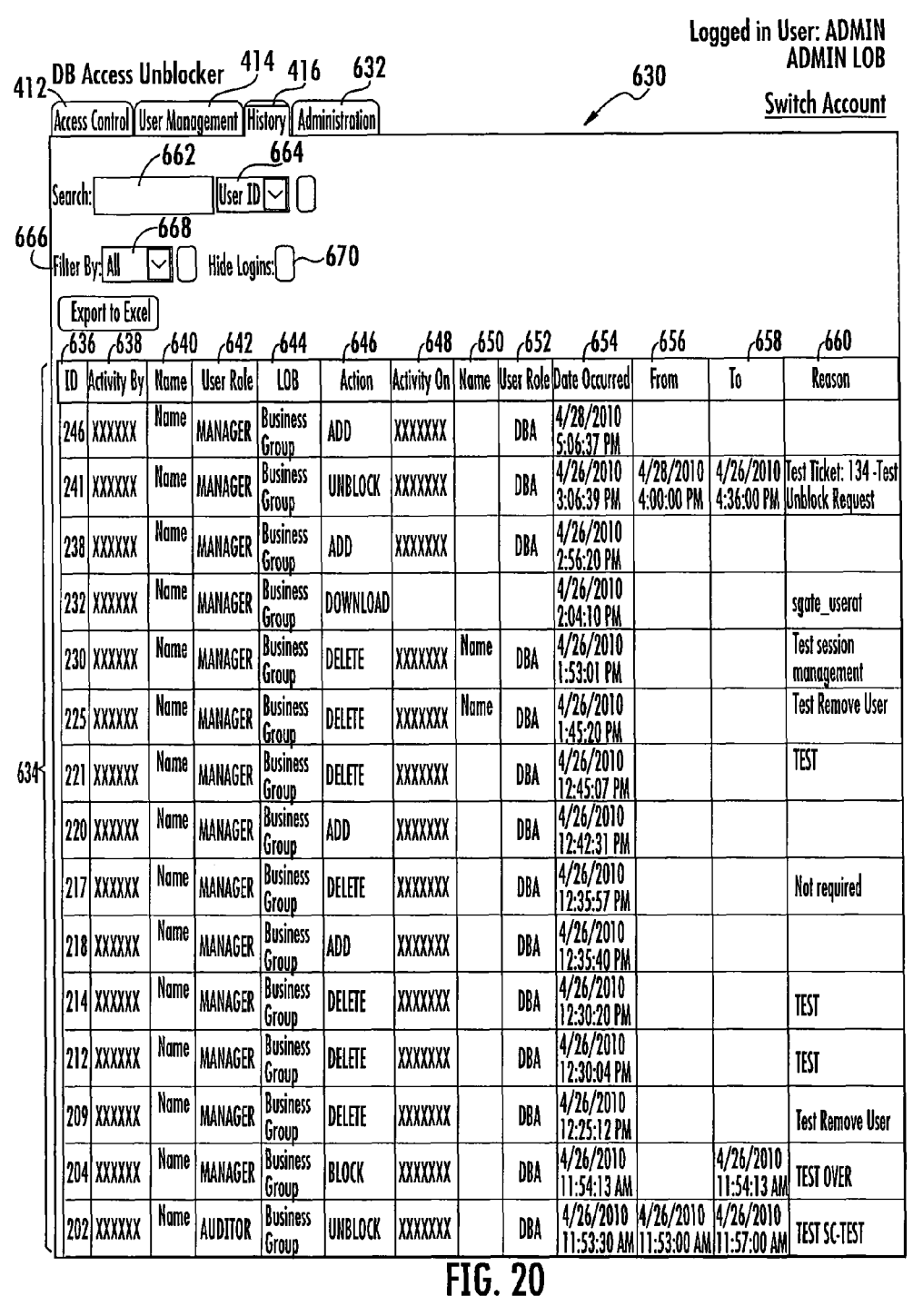

FIG. 20 is a user interface displayed in a database access system, highlighting historical tracking of actions occurring on the database access management system, in accordance with embodiments of the present invention;

FIG. 21 is a user interface displayed in a database access system and configured to initiate adding or editing a line-of-business/business group in the database access management system, in accordance with embodiments of the present invention;

FIG. 22 is a user interface displayed in a database access system and configured to receive information related to adding a line-of-business/business group in the database access management system, in accordance with embodiments of the present invention;

FIG. 23 is a user interface displayed in a database access system and configured to initiate adding or editing an auditor to the database access management system, in accordance with embodiments of the present invention;

FIG. 24 is a user interface displayed in a database access system and configured to initiate adding or editing a manager to the database access management system, in accordance with embodiments of the present invention;

FIG. 25 is a user interface displayed in a database access system and configured to initiate adding or editing a manager to the database access management system, in accordance with embodiments of the present invention; and FIG. 26 is a user interface displayed in a database access system and configured to initiate adding or editing a central manager apparatus to the database access management system, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, device, or propagation medium. More specific examples of the computer readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, further details are provided below for a centralized system for database access management. The centralized nature of the database access system means that all the access lists within a business or a line-of-business can be managed centrally, without the need to manage each access list independently. As a result of centralized management, reporting and auditing of actions related to database access management are greatly improved in that all actions are recorded and a historical database of such actions is available to system users. In addition, the centralized system provides for automatic notification to predetermined stakeholders based on occurrence of predetermined system actions, such as blocking a user from database access, unblocking a user from database access (i.e., granting access) or the like. Additionally by assigning an appropriate access level to various roles within the management system, separation of duties is achieved which results in tighter overall control of to whom and under what conditions database access can be granted.

In specific embodiments, the centralized system provides for granting users temporal access to databases for a prescribed period of time, such that upon expiration of the time period the user is automatically blocked (i.e., added back to the blacklist) from accessing the database. Such automatic blocking of the user after expiration of the unblock time period, obviates the need to perform a separate update/change to the access list after the need for database access expires. As a result of automatic blocking, oversights in failing to add the user back to the blocked access list are lessened, if not eliminated and the need for constant manual intervention is significantly reduced.

Referring to FIG. 1 shown is block diagram of an apparatus 100 configured for centralized database access management, in accordance with embodiments of the present invention. The apparatus 100 includes a computing platform 102 having at least one processor 104 and a memory 106 in communication with the processor 104. The memory 106 stores centralized database access management tool 108 that is configured to manage database access. The centralized database access management tool 108 may be implemented in conjunction with a conventional database monitoring application, such as a Guardium® application or like. As such, the centralized database access management tool 108 is configured to provide control over a database access-denied list, commonly referred to a blacklist, which lists those individuals, applications or other entities forbidden from accessing the database. The centralized nature of the tool 108 means that changes to database access can be made at one entry point, such a network-based database access system, and the changes can be affected across all the database monitoring apparatus, without the need to make individual changes to access lists stored at each specific database monitoring device.

Centralized database access management tool 108 includes database access control routine 110 which is configured to receive an unblock input 112 that provides for a database user to be granted access to a database from which the database user is currently being denied access (i.e., the database user is removed from the access-denied list (i.e., blacklist). The unblock input 112 includes a date/time period 114 which prescribes for the database user to be granted access to the database at a specific date and time and for access to subsequently denied at a later data and time. As such, by defining the date/time period 114 within the unblock input 112, the database user is automatically blocked from access the database upon expiration of the date/time period 112. As such, the tool prevents the need to have a separate block action/request made to the system, thereby, eliminating the security risk involved with database users being granted access for longer periods of time then necessary due to failure to place the database user back on the access-denied list.

FIG. 2 provides a more detailed depiction of the apparatus 100, according to further embodiments of the present invention. In addition to providing greater detail, FIG. 2 highlights various alternate embodiments. The apparatus 100 may include any type of one or more computing devices, such as a server or the like. The computing platform 102 is operable to receive and execute tools, modules, routines and applications, such as centralized database access management tool 108 and the like. Computing platform 102 includes memory 106, which may comprise volatile and nonvolatile memory such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, computing platform 102 also includes processor 104, which may be an application-specific integrated circuit ("ASIC"), or other chipset, processor, logic circuit, or other data processing device. Processor 104 or other processor, such as ASIC, may execute an application programming interface ("API") layer (not shown) that interfaces with any resident programs, such as centralized database access management tool 108 or the like stored in the memory 106 of the apparatus 100.

Processor 102 may include various processing subsystems (not shown) embodied in hardware, firmware, software and combinations thereof, that enable the functionality of apparatus 100 and the operability of the computing device on a network. For example, processing subsystems may allow for initiating and maintaining communications, and exchanging data, with other networked devices.

As previously noted in relation to FIG. 1, the memory 106 stores centralized database access management tool 108 that is configured to manage database access. Centralized database access management tool 108 includes database access control routine 110 which is configured to receive an unblock input 112 that provides for a database user to be granted access to a database from which the database user is currently being denied access (i.e., the database user is removed from the access-denied list (i.e., blacklist). The unblock input 112 includes a date/time period 114 which prescribes for the database user to be granted access to the database at a specific date and time and for access to subsequently denied at a later data and time. As such, by defining the date/time period 114 within the unblock input 112, the database user is automatically blocked from access the database upon expiration of the date/time period 112. The database access control routine 110 may additionally be configured to receive block input 116, which is configured to block a database user from further accessing a database prior to expiration of the date/time period 114. In specific instances, a database user's need to access a database may no longer exists even though the date/time period 114 has yet to expire. In such instances, the database access control routine 110 is configured to receive the block input 116 as a means of blocking the database user prior to the expiration of the date/time period 114.

Database access management tool 108 may additionally provide for user management routine 118 that is configured to receive a database user addition input 120. The database user addition input 120 provides for adding a new database user 122 to the database management system for the purpose of managing the new database user's access to the database. In specific embodiments, the default state upon adding a new user is to block the new database user 122 from accessing the database. As described in more detail below, an tool user (i.e, manager or the like) may provide for an unblock input to grant the new user access to the database for a prescribed date/time period. Additionally, the user management routine 118 is configured to receive a database user deletion input 124 that provides for removing the user from the management tool. In specific embodiments of the invention, as described in more detail below, a manager or someone else designated as an tool user may add a new database to the system or delete a database user from the system.

The database access management tool 108 may additionally database action tracking routine 126 that is configured to track, store and provide presentation of predetermined actions 130 occurring on the database access management tool. The actions tracked may include, but are not necessarily limited to, unblocking a database user, blocking a database user, adding a new database user, deleting a database user, tool user logins, data downloads and the like. The tracked information may include, but is not limited to, who performed the action, the action performed, the database user associated with the action, the date of the action, the applicable start and stop date/times and the business reason for the action. In addition, as described below, a network-accessible historical action database allows auditors, other tool users or the like to track, search, filter or the like previous actions performed via the database access management tool.

Moreover, the database access management tool 108 includes a notification routine 132 configured to automatically notify one or more entities of a predetermined action occurring via the database access management tool. The database action notification 134 may be communicated via email, text, voice or the like to the database user on whom the action is performed, managers or other entities designated within the line-of-business to whom the database user associated with the action belongs. The predetermined database actions 136 that precipitate notifications may include, but are not limited to, unblocking a database user, blocking a database user, adding a new database user, deleting a database user, editing the unblock date/time period or the like.

In addition, database access management tool 108 includes administrative routine 138 configured to receive new tool user inputs 140 and/or receive edit existing tool user inputs 142. New tool user inputs 140 may be provided for adding a new line-of-business./business group, an administrator, a manager, an auditor and/or central managers (i.e., device/apparatus for executing the database management tool). Edit tool user inputs 142 provide for editing the information, such as email addresses or the like, associated with a tool user (i.e., manager, administrator, auditor or the like), a line-of-business or central manager.

Turning to FIG. 3 a flow diagram is presented of a method 200 for centralized database management, in accordance with embodiments of the present invention. At Event 202, access to a computer-network based database access management tool is provided. The database access management tool provides centralized management if database access, whereby only a single unblock or block input is needed to effect access change, without the need to make changes to individual access-denied lists/blacklists associated with individual access monitoring apparatus.

At Event 204, an unblock input is received via the database access management tool. The unblock input is configured to provide a database user access to a database from which the database user is currently blocked from access. Additionally, the unblock input includes a date/time period for providing the database user access to the database. In other words, the unblock input serves to temporarily remove the database user from an access-denied list/blacklist.

At Event 206, the database user is automatically blocked from accessing the database upon expiration of the date/time period. Automatic blocking of the database user upon expiration of the date/time period obviates the need to perform a separate block action at the end of the time period.

FIG. 4 provides a schematic diagram of a system 300 configured to provide centralized database access management, in accordance with embodiments of the present invention. The system includes one or more apparatus 100 which stores centralized database access management tool 108 configured to provide centralized database access management. As previously noted the tool 108 may implemented in conjunction with a pre-existing database monitoring application. Thus, system 300 may additionally include one or more database monitoring devices 314 configured to monitor the use of database 316, stored at one or more database servers 302, or the like. The tool provides for controlling access to database 316 through inclusion or omission of database user 304 on access-denied/black list 306.

Database access management tool user's may include manager 308, administrator 310 and/or auditor 312. In specific embodiments, manager(s) 308 are authorized to access database management tool to unblock database user's from access to the database (i.e., temporarily remove the database user 304 from the black list 306) and/or block database user's to the database (i.e., add the database user 304 to the black list 306).

Once unblock requests or block requests are received at apparatus 100 they are communicated to the database server 302, via the database monitoring devices 314. Based on updates to the access denied/black lists the database user 304 is either granted temporary access to the database 316 (i.e., unblocked) or denied access to the database 316 (i.e., added back to the access denied/black list 306).

FIGS. 5-26 provide for exemplary user interfaces displayed in a network-accessible database access management system and, specifically, a system configured to provide for unblocking blocked database access for a prescribed time period, in accordance with an embodiment of the present invention.

FIG. 5 provides for a user interface 400 that is displayed in the event that the individual wishing to access the system is not currently authorized for system access. It should be noted that in specific embodiments of the system, access to the system is limited to individuals having a specific need to access the system. These individuals, collectively known as database access management system users or "system users" may include managers, administrators and auditors. In certain embodiments, managers are the only system users authorized to add new database access users, delete database access users and provide for unblocking and blocking of database access. Administrators are provided access to the system to add new managers, delete managers, add new lines-of-business/business groups or perform other designated administrative functions. Auditors are provided access to the system to obtain statistical and/or historical information pertaining to database unblock and block actions. A currently unauthorized user may provide inputs to user interface 400 that serve to request access to the system. In the illustrated embodiment of FIG. 5 the inputs include the user identification 402, which may be a name, an employee number/identifier, or the like, a business reason dialog box 404 for entering a business reason for requesting access to the system; and a "submit request" link 406 configured for submitting the access request. Once the access request has been reviewed and approved/disapproved by appropriate system authorizing personnel, the user requesting access is notified, by email or the like, of the approval or disapproval. Upon approval, an authorized user may be presented with an authentication window (not shown), which provides for the system user to enter a user identifier and password to gain access to the system.

FIG. 6 provides for user interface 410 configured for database user management. User interface 410 includes an access control tab 412, a user management tab 414 and a history tab 416. In the illustrated embodiment of FIG. 6, the user management tab 414 has been activated to display the information shown. The information includes a listing 418 of the database users currently in the access management system. The listing includes a database user identifier column 420, a first name column 422, a last name column 424, a user type 426, a line-of-business/business group column 428, a current status column 430 (i.e., unblocked or block) and a remover user column 432, which provides for a "remove user" link 434 configured to remove a database user in the event that the database is currently a blocked user. The information in the user management tab 414 additionally includes filter/search input field 436 that is configured to receive filter/search data, such as database user identifier, name or the like. Additionally, the information includes a filter/search field drop-down menu 438 that may be implemented in conjunction with the input field 436 to further define the filter/search criteria. In addition, the user interface 410 provides for a "remove filter" link 440 configured to return the filtered database user listing to the full database user listing.

Additionally, the user interface 410 of FIG. 6 includes an "add blocked user" link 442 configured to activate the user interface 450 shown in FIG. 7 to provide for adding a new database user to the system. As previously noted, in specific embodiments only a manager associated with the database user's line of business/business group is authorized to add new database users. The user interface 450 shown in FIG. 7 includes data entry fields for database user identifier field 452, manager identifier field 454, which is shown as prefilled based on manager login to the system, line-of-business/business group field 456, which provides for a drop down menu of the lines-of-business/business groups, database user first name field 458, database user last name field 460 and database user email address field 462. If the database user being added belongs to multiple lines-of-business/business, then the manager is required to make separate new user inputs for each line-of-business/business group.

In specific embodiments of the invention, in addition to the database user being an individual/associate/employee, the database user may be a service account (i.e., a non-human entity, such as a computer program or the like) that has access to the database. In specific embodiments of the invention service accounts are implemented for non-interactive batch processing. Thus, user interface 450 provides for a service account query 464, for identifying the database user as a service account and an account owner field 466 for entering the account owner, if the database user is a service account. Additionally, if the new database user is a service account, the first name field 458, last name field 460 and email address field 462 should be filled in with the service account owner's names and email address. Additionally, user interface 450 includes a "cancel" link 468 configured to cancel the addition of the new database user and a "block user" link 470 configured for adding the new database user as a blocked user.

FIG. 8 depicts the user interface 450 of FIG. 7 in which the data entry fields have been filled in and the new database user is a service account. FIG. 9 illustrates the user interface of FIG. 6 after the new database user has been added to the system. The highlighted row 472 depicts information for the new database user in the listing 418 of the database users currently in the database access system. As shown, the new database user is designated with a current status of "unblocked".

FIG. 10 illustrates a user interface 480 configured for database user management. User interface 480 includes the access control tab 412, the user management tab 414 and the history tab 416. In the illustrated embodiment of FIG. 10, the access control tab 414 has been activated to display access to pending actions 482, unblocked database users 484 and blocked users 486. Access may be provided in the form of collapseable display or like. In the user interface 480 of FIG. 10 only the pending actions 482 and unblocked users 484 are viewable while the blocked users 486 are hidden. The pending action list 488 reflects that a new user has been recently added to the database access system. The pending action list 488 includes a database user identifier column 490, a first name column 492, a last name column 494, a line-of-business/business group column 496, a pending action column 498, a start date column 500, a stop date column 502, an action by column 504, a business reason column 506, an error column 508 and an edit column 510. The unblocked user list 512 includes a database user identifier column 514, a first name column 516, a last name column 518, a start date column 520, a stop date column 522, a line-of-business/business group column 524, an unblocked by (manager identifier) column 526, a business reason column 528, a block user column 530 and an edit column 532. The block user column 530 provides for a "block" link 534 configured to block the database user from further access to the database, regardless of the stop date. Additionally, the unblocked user area 484 provides for an "export" link 536 configured, upon activation, to export selected data from the unblocked user list 512 to another application, such as a spreadsheet application or the like.

In the illustrated embodiment of FIG. 10, the entry in the pending action list 488 reflects that the pending action is to block the database user. According to specific embodiments of the invention, a short period of time, for example up to thirty minutes, may ensue between when a new database user is added to the system and when a backend job, such as a block, synchs up with an underlying database monitoring system. The highlighted entry in the unblocked user list 512 reflects that the current state of the new database user is unblocked. Thus, the new user was recently added to the system, for example, within the previous thirty minutes and, as such, the new user is currently unblocked from the database (i.e., has access to the database) with a pending action to block access for the new database user to occur when the next backend script runs.

FIG. 11 shows the user interface 480 of FIG. 10 after the backend script has executed and the new database user has been blocked from database access. As such, entries are no longer displayed in the pending action 482 or the unblocked user 484. The blocked user list 538 includes a database user identifier column 540, a first name column 542, a last name column 544, a line-of-business column 546, and an unblock user column 548. The fields within the unblock user column 548, provide for an "unblock" link 550 configured, upon activation, to unblock the database user (i.e., provide the database user access to the database for a prescribed time period). Additionally, the blocked user area 486 provides for an "export" link 552 configured, upon activation, to export selected data from the blocked user list 538 to another application, such as a spreadsheet application or the like.

Referring to FIG. 12 a user interface 560 is shown for removing a database user from the access management system. The user interface 560 may be accessed based on a manager activating the "remove user" link 434 in the remove user column 432 of the user management tab 414, as shown in FIG. 6. In specific embodiments, a manager may only remove database user from their specific line-of-business/business group. In addition, if a manager is both a manager and a database user, the manager can not remove themselves from the system, i.e., the "remove user" link 434 will not be displayed for the manager/database user within the database user listing when the manager is logged-in. The user interface 560 includes database user identifier field 562, name field 564, user type field 566, database user line-of-business/business group field 568 and business reason dialog box 570, which requires entry of a business reason for removing the user, such as user has left the entity/company, no longer need to be blocked from access, etc. The user identifier field 562, name field 564, user type field 566 and line-of-business field 568 is pre-populated with entries based on activation of the "remove user" link 434. The user interface 560 additionally includes a "cancel" link 572 configured, upon activation, for cancelling the removal of the database user and a "remove user" link 574 configured, upon activation, for executing removal of the database user from the system, i.e., the database user is no longer blocked from accessing the database. It should be noted that removing a database user does not remove the audit trail associated with that particular user (i.e., any block and/or unblock actions associated with the removed user will remain in the historical database of system actions).

FIG. 13 illustrates a user interface 580 for editing a database user's information. The user interface 580 may be accessed based on a manager activating an "edit user" link, which may be displayed in the access control tab 412 under the edit column 510, 532. In specific embodiments, a manager may only edit information pertaining to user from their specific line-of-business/business group. The user interface 580 includes database user field 582, first name field 584, last name field 586 and email field 588. The user identifier field 582 is pre-populated with an entry based on activation of the "edit user" link. The manager may enter the database user's first name, last name and/or email address and, upon activation of the "update info" link 592, the necessary edits to the database user's information will be stored in the system. In addition, a "cancel" link 590 is provided, which, upon activation, is configured for cancelling the editing of the database use information.

Turning the reader's attention to FIG. 14 a user interface 480 is shown that is configured for unblocking a database user for a prescribed time period (i.e., allowing the database user access to a database for a temporary period of time), in accordance with embodiments of the present invention. As previously noted, in specific embodiments, only managers are allowed to unblock database users. Unblocking of database access can occur in at least two manners; (1) a database user previously existing in the system can be unblocked, or (2) a new database user can be added to the system and an unblock action submitted in conjunction with adding the new user. In the illustrated user interface 480 of FIG. 14 an unlock input is requested for an existing database user. The user interface 480 includes access control tab 412, user management tab 414 and history tab 416. A manager has activated access control tab 412 to display the related information shown. The blocked user list 538 blocked user identifier column 540, first name column 542, last name column 544, line-of-business/business group column 546 and unblock user column 548. Each entry in the unblock user column 548 includes an "unblock" link 550 which, upon activation provides for display of the user interface 600 shown in FIG. 15, which is configured for an unblock request. Additionally, the blocked user area 486 provides for an "export" link 552 configured, upon activation, to export selected data from the blocked user list 538 to another application, such as a spreadsheet application or the like.

Referring to FIG. 15 a user interface 600 is depicted that is configured for requesting unblock of a database user. The user interface 600 provides for data entry fields including database user field 602, manager field 604, line-of-business/business group field 606, start date/time field 608, stop date/time field 610, ticket type field 612, ticket number field 614 and business reason dialog box 616. The database user field 602, manager field 604 and line-of-business field 606 are pre-populated based on activation of the "unblock" link 550 shown in the user interface 480 of FIG. 14. The start time and stop time are entered by the manager requesting the unblock and reflects the date and time for initiating processing of the unblock and for returning the database user to the blocked state. During the unblock period the database user is granted access to the secure database The business reason is entered in the dialog box 616 and provides for a description of the reason for unblocking the database user and granting access to the sensitive tables/information included therein. Additionally, user interface 600 includes a "cancel" link 618 configured to cancel the unblock request and a "submit unblock" link 620 configured for submitting the unblock request.

FIG. 16 illustrates a user interface 480 that may be accessed once an unblock request has been submitted, in accordance with embodiments of the present invention. The user interface includes access control tab 412, user management tab 414 and history tab 416. The access control tab 412 has been activated to display the information shown in user interface 480. Pending action list 482 includes database user identifier column 490, first name column 492, last name column 494, line-of-business/business group column 496, pending action column 498, start date/time column 500, stop date/time column 502, action by (i.e., manager identifier) column 504, business reason column 506, error column 508 and edit column 510. In the illustrated example of FIG. 16, the pending action list 488 shows the previously entered unblock request including the start date/time, the stop date/time, who requested the unblock and the business reason for the unblock. The edit column 510 provides for "edit" link 552, which allows the manager to change the unblock action, e.g., change the start date/time and/or stop date/time or cancel the unblock action. In addition, user interface 480 displays the blocked users list 538. The highlighted entry in the blocked user list 538 indicates a currently blocked user having a pending action (i.e., an unblock action pending).

Referring to FIG. 17, a user interface 480 is shown that may be accessed once the unblock start time has occurred and the database user has moved from the blocked state to the unblocked state. The user interface includes access control tab 412, user management tab 414 and history tab 416. The access control tab 412 has been activated to display the information shown in user interface 480. Once the start date/time occurs and the backend process runs to move the database user from the blocked state to the unblock state, the database user will be moved from the blocked user area 486 to the unblocked area 484. The database user's entry in the unblocked list 512 is highlighted to reflect the fact that an action is pending, i.e., the move from the unblocked state back to the block state after expiration of the unblock time period. As such, a pending action remains in the pending action list 488, reflecting the pending return of the database user to the blocked state.

In addition to unblocking an existing database user, the system also provides for unblocking a newly added user. FIG. 18 shows a user interface 480 configured for unblocking a newly added user in accordance with an embodiment of the present invention. The user interface includes an access control tab 412, user management tab 414 and a history tab 416. The access control tab 412 has been activated to display the information shown in user interface 480. A new database user request has been entered. As previously noted, according to specific embodiments, upon entering a new database into the system, the user is designated as unblocked until the next script is executed and the database used moves to the blocked state, which is the default new user state. As such, the unblocked user list 512 includes a database user entry, which is highlighted to reflect an action pending (i.e., a move from the unblocked state to the blocked state). In addition, the pending action list 488 includes a database user entry that reflects the pending block action. The edit column 510 within the pending action list 488 includes an "edit" link 552, which, upon activation, displays the user interface 600 shown in FIG. 15, which provides for a manager to create an unblock request for the newly added database user. As such, the manager can create an unblock request prior to the occurrence of the pending block action.

As previously noted, in specific embodiments, any newly added database user, by default, is added to the system as blocked. In addition, when the time period associated with an unblock action expires; the database user is automatically moved back to the blocked state. Additionally, the system may be configured to allow for a manager to block a database user prior to expiration of the unblock time period. For example, if the database user no longer has a need to access the database or otherwise has completed their access needs. FIG. 19 provides for a user interface 480 configured for allowing a manager to block a database user from accessing the database prior to expiration of the unblock time period. The user interface includes an access control tab 412, user management tab 414 and a history tab 416. The access control tab 412 has been activated to display the information shown in user interface 480. The unblocked user list 512 includes database user entry, which reflects a database user currently in an unblocked state. The unblocked user list 512 includes block user column 530, which includes "block" link 534. The "block" link 534 may be activated to request that the database user by blocked from further access to the database prior to expiration of the unblock time period.

Referring to FIG. 20 a user interface 630 is depicted that provides for records of system action, in accordance with embodiments of the present invention. The user interface 630 includes an access control tab 412, user management tab 414, a history tab 416 and an administration tab 632. The history tab 416 has been activated to display the information shown in user interface 630. The historical record list 634 is configured to provide an audit trail of all actions occurring within the system. The actions include, but are not necessarily limited to, adding a ne database user to the system, deleting a database user from the system, unblocking a database user fro a prescribed time period, blocking a database user prior to expiration of the unblock time period, system login by a manager, administrator or auditor, exporting of data to another application or the like. In specific embodiments, the managers, administrators and auditors have access to the historical record list 634. The historical record list includes action identifier (i.e., ticket number) column 636, activity by (i.e., who performed the action) identifier column 638, name of who performed the action column 640, role of who performed the action 642, line-of-business column 644, action performed column 646, database user identifier column 648, name of database user column 650, role of database user column 652, date action occurred column 654, start time/date of action column 656, stop time/date of action column 658 and reason for action column 660. In addition, user interface 630 provides for search engine 662, which is configured to provide for searching of an action within a selected search field, as provided by search drop-down menu 664. As such, the actions may be searched by database user identifier, activity by identifier, line-of-business, ticket number or the like. In addition, user interface 630 provides for filter mechanism 666, which is configured to filter the historical record list 634 according to filter criteria as selected by filter drop down menu 668. As such, the historical record list 634 may be filtered by a specific action type, database user identifier, line-of-business or the like. In addition, a check box 670 is provided to hide or include system logins from the historical record list 634.

FIG. 21 provides a user interface 680 for an administrator to assign roles and manage line-of-business settings within the database access system, in accordance with embodiment of the present invention. The user interface 680 includes an access control tab 412, user management tab 414, a history tab 416 and an administration tab 632. The administration tab 632 has been activated to display the information shown in user interface 680. In specific embodiments, only system users designated as administrators have access to the administration tab 632. User interface 680 is configured to provide access to line-of-business information and allow for administrators to edit line-of-business information or add a new line-of-business. The line-of-business list 682 includes line-of-business identifier column 684, line-of-business name column 686, comments column 688, email column 690, central manager column 692 and edit column 694. The edit column 694 includes an "edit" link 696, which, upon activation provides for a user interface to be displayed that allows for editing the information associated with the line-of-business.

Additionally, user interface 680 of FIG. 21 includes an "add LOB" link 698, which, upon activation, allows an administrator to add a line-of-business/business group to the database access system. FIG. 22 provides a user interface 700 for adding a line-of-business, in accordance with embodiments of the present invention. The user interface 700 of FIG. 22 may be displayed upon activation of the "add LOB" link 698, shown in the user interface 680 of FIG. 21. The user interface 700 includes data entry fields, such as, line-of-business name field 702, comments field 704, email address fields 706, and central manager field 708, which, as shown is depicted in the form of a drop-down menu. The email addresses associated with the line-of-business are configured to receive a notification email when designated actions occur affecting the line-of-business. The designated actions may be adding a database user, adding an unblock request for a prescribed time period, and the like. Additionally, user interface 700 includes a "cancel" link 710 configured to cancel the addition of the new line-of-business and a "add LOB" link 712 configured for executing the adding of the line-of-business.

FIG. 23 provides a user interface 680 for an administrator to manage auditors and auditor settings within the database access system, in accordance with embodiment of the present invention. The user interface 680 includes an access control tab 412, user management tab 414, a history tab 416 and an administration tab 632. The administration tab 632 has been activated to display the information shown in user interface 680. User interface 680 is configured to provide access to auditor information and allow for administrators to edit auditors information or add a new auditor. The auditor list 720 includes auditor identifier column 722, auditor name column 724, email column 726, line-of-business column 728 and edit column 730. The edit column 730 includes an "edit" link 732, which, upon activation provides for a user interface to be displayed that allows for editing the information associated with the auditor.

Additionally, user interface 680 of FIG. 23 includes an "add auditor" link 734, which, upon activation, allows an administrator to add an auditor to the database access system. A user interface (not shown) may be displayed upon activation of the "add auditor" link 734, shown in the user interface 680 of FIG. 23. The user interface includes data entry fields, such as, auditor identifier field, line-of-business field, auditor first name field, auditor last name field, and auditor email address field.

FIG. 24 provides a user interface 680 for an administrator to manage managers and manager settings within the database access system, in accordance with embodiment of the present invention. The user interface 680 includes an access control tab 412, user management tab 414, a history tab 416 and an administration tab 632. The administration tab 632 has been activated to display the information shown in user interface 680. User interface 680 is configured to provide access to manager information and allow for administrators to edit manager information or add a new manager. The manager list 740 includes manager identifier column 742, manager name column 744, email column 746, line-of-business/business group column 748 and edit column 750. The edit column 750 includes an "edit" link 752, which, upon activation provides for a user interface to be displayed that allows for editing the information associated with the manager.

Additionally, user interface 680 of FIG. 24 includes an "add manager" link 754, which, upon activation, allows an administrator to add a manager to the database access system. A user interface (not shown) may be displayed upon activation of the "add manager" link 754, shown in the user interface 680 of FIG. 24. The user interface includes data entry fields, such as, manager identifier field, line-of-business field, manager first name field, manager last name field, and manager email address field.

FIG. 25 provides a user interface 680 for an administrator to manage administrators and administrator settings within the database access system, in accordance with embodiment of the present invention. The user interface 680 includes an access control tab 412, user management tab 414, a history tab 416 and an administration tab 632. The administration tab 632 has been activated to display the information shown in user interface 680. User interface 680 is configured to provide access to administrator information and allow for administrators to edit administrator information or add a new administrator. The administrator list 760 includes administrator identifier column 762, administrator name column 764, email column 766, and edit column 768. The edit column 768 includes an "edit" link 770, which, upon activation, provides for a user interface to be displayed that allows for editing the information associated with the administrator.

Additionally, user interface 680 of FIG. 25 includes an "add administrator" link 772, which, upon activation, allows an administrator to add an administrator to the database access system. A user interface (not shown) may be displayed upon activation of the "add administrator" link 722, shown in the user interface 680 of FIG. 25. The user interface includes data entry fields, such as, administrator identifier field, administrator first name field, administrator last name field, and administrator email address field.

FIG. 26 provides a user interface 680 for an administrator to add central managers, i.e., system hardware within the database access system, in accordance with embodiment of the present invention. The user interface 680 includes an access control tab 412, user management tab 414, a history tab 416 and an administration tab 632. The administration tab 632 has been activated to display the information shown in user interface 680. User interface 680 is configured to provide access to central manager information and allow for administrators to edit central manager information or add a new central manager. The central manager list 780 includes domain name column 782, Internet Protocol (IP) address column 784, CLI login column 786, GUI login column 788, guard group name column 790 and edit column 792. The edit column 792 includes an "edit" link 794, which, upon activation provides for a user interface to be displayed that allows for editing the information associated with the central manager.

Additionally, user interface 680 of FIG. 26 includes an "add central manager" link 796, which, upon activation, allows an administrator to add a central manager to the database access system. A user interface (nit shown) may be displayed upon activation of the "add central manager" link 796, shown in the user interface 680 of FIG. 26. The user interface includes data entry fields, such as, fully qualified domain name field, IP address of the central manager field, CLI login field, CLI login password field, GUI login field, GUI login password field, and guard group name manager email address field.

As previously noted the database access system is configured to automatically communicate notifications, such as email notifications or the like, to one or more entities based on an action occurring within the system. The actions which prompt automatic communication of a notification include, but are not necessarily limited to, adding a new database user, deleting/removing a database user, blocking a database user from access, unblocking a database user, editing an unblock time period or the like. The entities that may be configured to receive the automatic notifications include, but are not necessarily limited to, the database user on whom the action is performed, the manager that performed the action, a predetermined corporation/business distribution group and any email address identified in the line-of-business/business group profile.

Thus, present embodiments of the invention described above provide for a centralized system for database access management. In specific embodiments, the centralized system provides for granting users temporal access to databases for a prescribed period of time, such that upon expiration of the time period the user is automatically blocked (i.e., added back to the blacklist) from accessing the database. As a result of automatic blocking, oversights in failing to add the user back to the blocked access list are lessened, if not eliminated and the need for constant manual intervention is significantly reduced. Moreover, as a result of centralized management, reporting and auditing of actions related to database access management are greatly improved in that all actions are recorded and a historical database of such actions is available to system users. In addition, the centralized system provides for automatic notification to predetermined stakeholders based on occurrence of predetermined system actions, such as blocking a user from database access, unblocking a user from database access (i.e., granting access) or the like. Additionally by assigning an appropriate access level to various roles within the management system, separation of duties is achieved which results in tighter overall control of to whom and under what conditions database access can be granted.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus configured for centralized database access management, the apparatus comprising:
   a computing platform including a processor and a memory; and
   a database access management tool stored in the memory, executable by the processor and configured to provide centralized database access management for a plurality of databases that store non-public information at corresponding database servers, wherein the tool includes:
     a database access control routine configured to receive an unblock input that includes (1) a user-specific unblock date and time configured for automatically providing a database user access to a database from which the database user is currently blocked from access upon occurrence of the unblock date and time and (2) a user-specific block date and time configured for automatically blocking the database user from accessing the database upon occurrence of the block date and time,
   wherein, based on receipt of the unblock input, the tool is configured to communicate (1) a first block list update request to a database server that stores the database, wherein the first block list update is configured to remove, at the unblock date and time, the database user from a block list and (2) communicate a second block list update request to the database server, wherein the second block list update is configured to add, at the block date and time, the database user to the block list.

2. The apparatus of claim 1, wherein the database access management tool further comprises a user management routine configured to receive a database user addition input that adds a new database user to the database access management tool and provides for managing the new database user's access to the one or more databases.

3. The apparatus of claim 2, wherein the user management routine is further configured to receive a user deletion input that removes a database user from the database access management tool.

4. The apparatus of claim 1, wherein the database access management tool further comprises a database action tracking routine that is configured to track and store predetermined actions taken by the access management tool.

5. The apparatus of claim 4, wherein the database action tracking routine is further configured to store actions taken by the access management tool, wherein the actions taken include adding a new database user, deleting a database user, logging into the database access management tool, unblocking a database user from blocked access, blocking a database user from access to an unblocked database prior to expiration of the predetermined time period and exporting information from the database access management tool.

6. The apparatus of claim 4, wherein the database action tracking routine is further configured to provide a network-accessible presentation of the tracked actions occurring within the database access management tool.

7. The apparatus of claim 1, wherein the database access management tool further comprises a notification routine configured to automatically communicate a notification that notifies one or more predetermined entities of actions occurring within the database access management tool.

8. The apparatus of claim 7, wherein the notification routine is further configured to automatically communicate a notification that notifies one or more predetermined entities of the actions occurring within the database access management tool, wherein the actions include unblocking a database user, blocking a database user, adding a new database user, or deleting a database user.

9. The apparatus of claim 1, wherein the database access control routine is further configured to receive a block input that blocks the database user's access to the database prior to occurrence of the block date and time.

10. A method for centralized database access management, the method comprising:
    providing, via a computer device, access to a computer network-based database access management tool configured to provide centralized database access management for a plurality of databases that store non-public information at corresponding database servers;
    receiving, via the database access management tool, an unblock input that includes (1) a user-specific unblock date and time configured to automatically provide a database user access to a database from which the database user is currently blocked from access upon occurrence of the unblock date and time and (2) a user-specific block date and time configured to automatically block the database user from accessing the database upon occurrence of the block date and time;
    communicate, from the database access management tool to a database server that stores the database, a first block list update request configured to remove, at the unblock date and time, the database user from a block list;
    providing, via a computing device processor, the database user access to the database by removing the database user from the block list upon occurrence of the unblock date and time;
    communicating, from the database access management tool to the database server, a second block list update request configured to add, at the block date and time, the database user to the block list; and
    denying, via a computing device processor, the database user access to the database by adding the database user to the block list upon occurrence of the block date and time.

11. The method of claim 10, further comprising receiving, via the database access management tool, a database user addition input that is configured to add a new database user to the database access management tool and provides for managing the new database user's access to the one or more databases.

12. The method of claim 11, further comprising receiving, via the database access management tool, a database user deletion input that is configured to remove a database user from the database access management tool.

13. The method of claim 10, further comprising a storing, in computing device memory, information associated with predetermined actions occurring via the database access management tool.

14. The method of claim 13, further comprising providing, via the database access management tool, access to the information associated with the predetermined actions occurring via the database access management tool.

15. The method of claim 10, further comprising automatically communicating, via the database access management tool, electronic notifications to one or more predetermined entities based on receiving the unblock input, wherein the electronic notifications notify the one or more predetermined entities of the database user's access to the database.

16. The method of claim 10, further comprising receiving, via the database access management tool, a block input that is configured to block the database user's access to the database prior to occurrence of the block date and time.

17. A computer program product comprising:
    a non-transitory computer-readable medium comprising:
    a first set of codes for causing a computer to provide access to a computer network-based database access management tool configured to provide centralized database access management for a plurality of databases that store non-public information at corresponding database servers;
    a second set of codes causing a computer to receive, via the database access management tool, an unblock input that (1) a user-specific unblock date and time configured to automatically provide a database user access to a database from which the database user is currently blocked from access upon occurrence of the unblock date and time (2) a user-specific block date and time configured to automatically block, the database user from accessing the database upon occurrence of the block date and time;
    a third set of codes for causing a computer to communicate, from the database access management tool to a database server that stores the database, a first block list update request configured to remove, at the unblock date and time, the database user from a block list;
    a fourth set of codes for causing a computer to provide the database user access to the database by removing the database user from the block list upon occurrence of the unblock date and time;
    a fifth set of codes for causing a computer to communicate, from the database access management tool to the database server, a second block list update request configured to add, at the block date and time, the database user to the block list; and
    a sixth set of codes for causing a computer to deny the database user access to the database by adding the database user to the block list upon occurrence of the block date and time.

18. The computer program product of claim 17, further comprising a seventh set of codes for causing a computer to receive, via the database access management tool, a database user addition input that is configured to add a new database user to the database access management tool and provides for managing the new database user's access to the one or more databases.

19. The computer program product of claim 18, further comprising a eighth set of codes for causing a computer to receive, via the database access management tool, a database user deletion input that is configured to remove a database user from the database access management tool.

20. The computer program product of claim 17, further comprising a seventh set of codes for causing a computer to store, in computing device memory, information associated with predetermined actions performed on the database access management tool.

21. The computer program product of claim 20, further comprising a eighth set of codes for causing a computer to provide, via the database access management tool, access to the information associated with the predetermined actions performed on the database access management tool.

22. The computer program product of claim 17, further comprising a seventh set of codes for causing a computer to automatically communicate, via the database access management tool, electronic notifications to one or more predetermined entities based on receiving the unblock input, wherein the electronic notifications notify the one or more predetermined entities of the database user's access to the database.

23. The computer program product of claim 17, further comprising a fourth set of codes for causing a computer to receive, via the database access management tool, a block input that is configured to block the database user's access to the database prior to occurrence of the block date and time.

* * * * *